United States Patent [19]
Takahashi et al.

[11] Patent Number: 5,999,266
[45] Date of Patent: Dec. 7, 1999

[54] METHOD FOR INSPECTING HEIGHT, AND A HEIGHT INSPECTION APPARATUS TO CARRY OUT THE METHOD

[75] Inventors: Fumiyuki Takahashi; Hiroyuki Tsukahara; Yoshitaka Oshima; Youji Nishiyama; Takashi Fuse, all of Kawasaki, Japan

[73] Assignee: Fujitsu Limited, Kawasaki, Japan

[21] Appl. No.: 08/954,286

[22] Filed: Oct. 20, 1997

[30] Foreign Application Priority Data

Dec. 9, 1996 [JP] Japan ..................................... 8-328317
Jul. 29, 1997 [JP] Japan ..................................... 9-203539

[51] Int. Cl.$^6$ .................................................. G01B 11/24
[52] U.S. Cl. ........................................ 356/376; 356/237.5
[58] Field of Search ................................ 356/376, 237.4, 356/237.5

[56] References Cited

U.S. PATENT DOCUMENTS

| | | | |
|---|---|---|---|
| 4,589,773 | 5/1986 | Ido et al. ................................. | 356/371 |
| 4,698,513 | 10/1987 | Tojo et al. ............................... | 250/561 |
| 5,392,110 | 2/1995 | Yojima et al. ............................. | 356/1 |
| 5,654,800 | 8/1997 | Svetkoff et al. ........................ | 356/376 |

*Primary Examiner*—Frank G. Font
*Assistant Examiner*—Zandra V. Smith
*Attorney, Agent, or Firm*—Staas & Halsey, LLP

[57] ABSTRACT

The present invention is a method for inspecting height, scanning the surface of a subject item having zones of different reflectance with incident light of a prescribed intensity, causing the reflected light from the surface to be imaged with means for detecting light spot positions, and detecting the height of said light surface from the light spot position which was imaged, said method comprising: a step of scanning, in a second zone with low reflectance surrounding a first zone with high reflectance with a first intensity of incident light, which is low to the degree that said means for detecting light spot positions is not saturated even with said high reflectance; and a step of scanning, if it is detected that the quantity of light of the imaged light of said reflected light exceeds a prescribed threshold value, with an appropriate second intensity of incident light found from said intensity of incident light and said detected quantity of light at the time of the preceding scan.

19 Claims, 30 Drawing Sheets

Focal Position

Rear (Posterior)

Front (Anterior)

Focal Position

Posterior

Anterior

No Optical Axis Dislocation

Optical Axis Dislocation

FIG. 20

CORRECTION TABLE

| Measured Value | ... | $X_n$ | $X_{n+1}$ | $X_{n+2}$ | $X_{n+3}$ | ... |
|---|---|---|---|---|---|---|
| Corrected Value | ... | $Y_n$ | $Y_{n+1}$ | $Y_{n+2}$ | $Y_{n+3}$ | ... |

FLOW CHART OF HEIGHT DETECTION WITH IDEAL SWEEP VOLTAGE CURVE OF INPUT VOLTAGE Vin

METHOD OF DETECTING FOCAL POINT POSITION OF OPTICAL SYSTEM

METHOD OF FINDING OUT SCANNING VELOCITY $v_0$ WITH ASTIGMATISM = 0

SWEEP WAVEFORM OF Vin FOR IDEAL SCANNING VELOCITY $v_0$ WITH ASTIGMATISM = 0

METHOD FOR INSPECTING HEIGHT, AND A HEIGHT INSPECTION APPARATUS TO CARRY OUT THE METHOD

BACKGROUND OF THE INVENTION

1. Field of the Invention

The present invention relates to a method for inspecting height and a height inspection apparatus to carry out that method, especially a method and a height inspection device to carry out that method to inspect efficiently and with good precision the height of bumps formed on the surface of a semiconductor chip.

2. Description of the Related Art

A plurality of bump terminals, as input/output terminals, is arranged in a matrix on the surface of a semiconductor chip and the semiconductor chip is placed face down and bonded to a substrate. Such a semiconductor chip is called a flip chip and is used in multi-chip modules, etc.

These bump terminals are spherical terminals formed on electrodes formed on the surface of a semiconductor substrate; they include metal bumps formed with a plating method and solder bumps formed with a solder dip method.

A chip on which a plurality of bump terminals is formed is bonded face down on a substrate. In that case, each bump terminal must connect properly with the corresponding electrode on the substrate. Consequently, it is necessary that the form and height of the bumps be uniform. A height less than other bumps causes the connection with the electrode on the substrate to be no good. When the height is greater and the bump form large, the risk is of a short circuit with adjacent bumps in the bonding step.

Therefore, generally the height of bumps on the surface is inspected before a flip chip is bonded. General methods for inspecting height include the triangulation method wherein light is irradiated, the reflected light thereof is imaged on a split photodiode and PSD (Position Sensitive Detector), and the height detected. Consequently, the surface is scanned with laser beams and the height of each bump, according to the position of the reflected light, is inspected.

However, in the case of scanning spherical bumps with laser beams, the reflected light thereof causes a very irregular reflection in the vicinity of the bump and has a very high reflectance at the apex of the bump, while the reflectance on the surface outside the bump zone is comparatively constant. Because the reflectance of the surface varies greatly in this way, the intensity of the reflected light varies greatly when the intensity of the radiated light is constant. This is the reason why the quantity of reflected light deviates from the dynamic range of the PSD and photodiode; and the problem is that the height cannot be correctly measured.

Also, the method of measuring height directly from the position of the reflected light imaged on the position sensitive detector (PSD) with the triangulation method discussed above is effective for measuring the height of multiple bumps on a semiconductor chip surface. However, the direction of the reflected light is not constant according to the reflection position of the incident light on the bumps due to the curved shape of the bumps. As a result, errors occur in the height detected with the position sensitive element. Also, the focal displacement of the optical system also results in errors in the height detected. Moreover, the direction of those errors differs according to whether this was an anterior focal point or a posterior focal point. Furthermore, the position of the apex of the bump detected is displaced due to the displacement of the optical axis of the optical system to receive the reflected light; the detected height includes some error.

Furthermore, another problem is that an acousto-optic deflector is used for high speed scanning with laser beams of an LSI (large scale integration) chip having multiple bumps. The frequency variation signal supplied to the acousto-optic deflector is produced with a voltage oscillation circuit, for example. However, the problems include the problem of the astigmatism of this acousto-optic deflector, the problem of a dynamic variation of the astigmatism according to the distorted output characteristics of the voltage controlled oscillator, and the problem of the tolerance of the optical system. Because of these problems, it is very difficult to effect scanning of the measured object at a uniform speed and with zero astigmatism.

These problems are all problems brought about in the case of detecting the height of multiple bumps on a LSI chip. The resolution of all these problems is necessary for accurate height inspection.

SUMMARY OF THE INVENTION

Therefore, it is an object of the present invention to provide a method and an inspection apparatus for inspecting the height of bump terminals formed on the surface of a semiconductor chip efficiently and with good precision.

Also, it is an object of the present invention to provide a method and related inspection apparatus to inspect the height of a sample surface having zones of very different reflectance, which is not limited to bumps on a semiconductor chip.

Also, it is an object of the present invention to provide a method for inspecting height and related inspection apparatus which can correct errors in detected height caused by the curved surface of the bumps.

Also, it is an object of the present invention to provide a method for inspecting height and related inspection apparatus which can eliminate irregularities in scanning speed, focal blurring, and astigmatism of the scanning beams, which derives from the properties of the acousto-optic deflector and the voltage controlled oscillator which drives it.

These objects are attained through the present invention providing a method for inspecting height, scanning the surface of a subject item having zones of different reflectance with incident light of a prescribed intensity, causing the reflected light from the surface to be imaged with means for detecting light spot positions, and detecting the height of said surface from the light spot position which was imaged, said method comprising: a step of scanning, in a second zone with low reflectance surrounding a first zone with high reflectance with a first intensity of incident light, which is low to the degree that said means for detecting light spot positions is not saturated even with said high reflectance; and a step of scanning, if it is detected that the quantity of light of the imaged light of said reflected light exceeds a prescribed threshold value, with an appropriate second intensity of incident light found from said intensity of incident light and said detected quantity of light at the time of the preceding scan.

Furthermore, with the present invention, the aforementioned second intensity of incident light $Pn+1(i)$ is found through a calculation according to the formula $$Pn+1(i)=Pn(i) \times Bt/Bn(i)$$

(Bt is a prescribed value within the dynamic range of the aforementioned means for inspecting light spot positions)

from the intensity of incident light Pn(i) at the time of the preceding scan and the quantity of light Bn(i) detected at that time.

Furthermore, the present invention is characterized in that the aforementioned intensity of incident light is set to zero and scanning effected in zones other than the aforementioned first and second zones.

Furthermore, with the present invention, the aforementioned threshold value is set at a value higher than the quantity of light detected for the aforementioned first intensity of incident light in the aforementioned second zone.

Furthermore, with the present invention, the aforementioned subject item has bump terminals with a roughly spherical form formed on a substrate surface; the aforementioned first zone is in the vicinity of the apex of said bump terminal; and said second zone is a zone surrounding the vicinity of said bump apex.

The method for inspecting height of the present invention is especially effective in detecting the height of bump terminals on a semiconductor chip.

Furthermore, with the present invention, a height inspection apparatus, which scans the surface of a subject item having zones of different reflectance with incident light of a prescribed intensity, causes the reflected light from the surface to be imaged with means for detecting light spot positions, and detecting the height of said surface from the light spot position which was imaged, said apparatus comprises:

light emitting means for generating said incident light;

light emission driving means for driving said light emitting means; and modulation means for controlling said light emission driving means in such a manner that, for scanning in a second zone with low reflectance surrounding a first zone with high reflectance, the light emitting means generate a first intensity of incident light, which is low to the degree that said means for detecting light spot positions is not saturated even with said high reflectance if the quantity of light of the imaged light of said reflected light is detected to exceed a prescribed threshold value, the light emitting means generates an appropriate second intensity of incident light found from said intensity of incident light and said detected quantity of light at the time of the preceding scan.

Furthermore, with the present invention, the modulation means determines the second intensity of incident light Pn+1(i) through a calculation according to the formula $$Pn+1(i)=Pn(i) \times Bt/Bn(i)$$

(Bt is a prescribed value within the dynamic range of the aforementioned means for inspecting light spot positions) from the intensity of incident light Pn(i) at the time of the preceding scan and the quantity of light Bn(i) detected at that time.

In order to attain the objects, the present invention is a method for inspecting height, radiating incident light on the surface of a subject item having a nonplanar surface, causing the reflected light from that surface to be imaged with means for detecting light spot positions, and detecting the height of said surface from the light spot position which was imaged, comprising: a first step of corrective height detection to cause a stage on which a standard subject item is mounted to move in the direction of the Z axis and detect the height of the surface of said standard subject item as a first corrective height value; a second step of corrective height detection to radiate incident light on said surface of said standard subject item, cause the reflected light from that surface to be imaged with said means for detecting light spot positions, and detect the height of the surface of said standard subject item from the light spot position which was imaged as a second corrective height value; a step of height detection for measurement to radiate incident light on the surface of said subject item, cause the reflected light from that surface to be imaged with said means for detecting light spot positions, and detect the height of the surface of said subject item from the light spot position which was imaged as a measurement height value; and a step of correction to correct said measurement height value, according to the correlation between said first corrective height value and second corrective height value, and prepare a corrected height value.

With the present invention, errors in detected height, caused in the case of a measured object having a curved surface such as bumps on an LSI chip, are corrected appropriately. A first step of corrective height detection in order to find a correction function or table includes steps which take time, such as for moving the stage in the direction of the Z axis. After the correction function is established, the heights of multiple bumps are detected with high speed height measurement using the light spot position sensitive device.

In order to attain the objects, the present invention is a method for inspecting height, deflecting incident light with an acousto-optic deflector, scanning the surface of a subject item with the deflected incident light via a cylindrical lens and an incident light optical system, causing the reflected light from that surface to be imaged with means for detecting light spot positions, and detecting the height of said surface from the light spot position which was imaged, said method comprising: a setting step of scanning a setting sample having a prescribed pattern on the stage, on which said subject item is mounted, with said incident light, while varying an input signal of a driving circuit to provide a scanning frequency signal to said acousto-optic deflector, and, through observing the quantity of the reflected light, finding a sweep curve of said input signal such that said incident light is scanned at a uniform speed and is focused without astigmatism on said setting sample; and a height detection step of providing said input signal according to said sweep curve to said driving circuit, scanning said incident light on the surface of said measured object, causing the reflected light from that surface to be imaged with said means for detecting light spot positions, and detecting the height of said surface from the light spot position which was imaged.

With the present invention, the problem of astigmatism, due to the cylindrical effect when using an acousto-optic deflector to make possible high speed scanning, and the problems due to the characteristic distortion of the circuit which drives the acousto-optic deflector and the tolerance of the optical system can be resolved. With the present invention, the sweep curve of the input signal to the driving circuit: can be found by scanning the sample with incident light: and monitoring the quantity of reflected light.

BRIEF DESCRIPTION OF THE DRAWINGS

FIG. 20 is a drawing to show an example of a conversion table for correction;

FIGS. 33A to 33D are a drawing to explain the method for detecting the focal point of the optical system;

DESCRIPTION OF THE PREFERRED EMBODIMENTS

Below, an example of a mode for carrying out the present invention is explained with reference to the figures. However, such an example of an embodiment does not limit the technical scope of the present invention.

Figure 1:
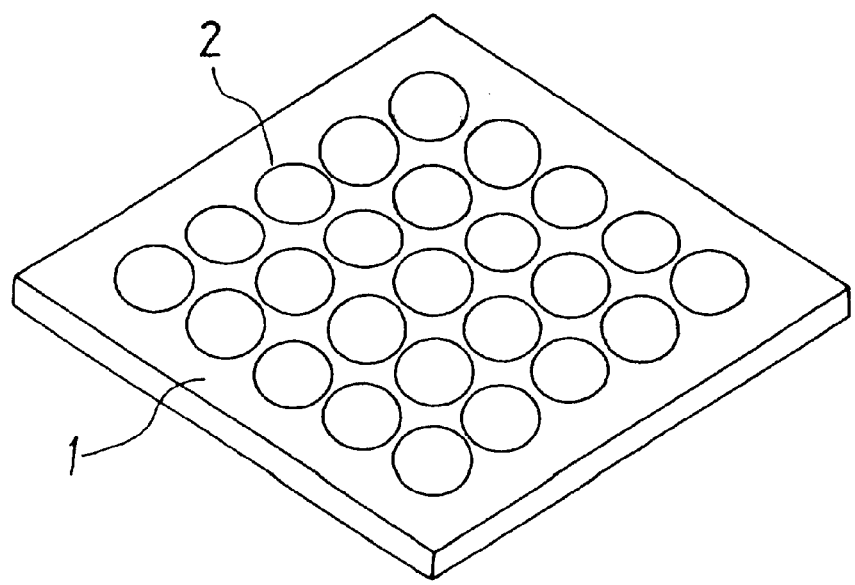
FIG. 1 is an inclined view to show bump terminals formed on the surface of a semiconductor chip.

FIG. 1 is an inclined view to show the bump terminals formed on the surface of a semiconductor chip. A plurality of bump terminals 2 are arranged in a matrix on the surface of the chip 1.

Figure 2:
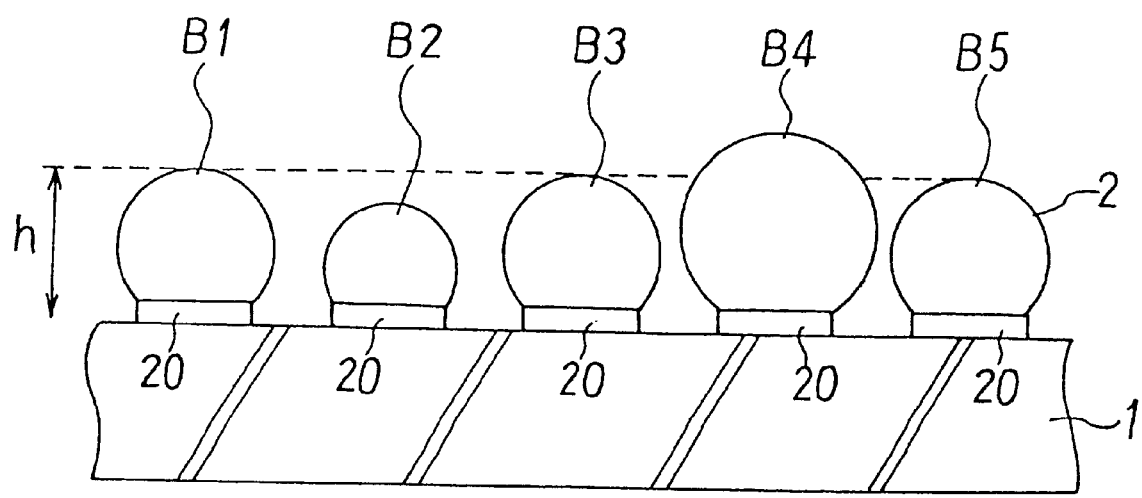
FIG. 2 is a partial cross section of a semiconductor chip 1 on which bump terminals are formed.

FIG. 2 is a partial cross section of the semiconductor chip 1 on which the bump terminals are formed. Spherical bump terminals 2 are formed on the electrode 20 formed on the surface of the semiconductor chip 1. In the example shown in FIG. 2, bumps B1, B3, and B5 are normal in size and are formed to the correct height h, but bump B2 is small in form and its height is less than the normal height h and bump B4 is large in form and its height is greater than the normal height h. Generally, the height and size of bumps are relative; therefore, bad bonding can be determined according to the detection in advance of whether the height of a bump is the normal height h.

Figure 3:
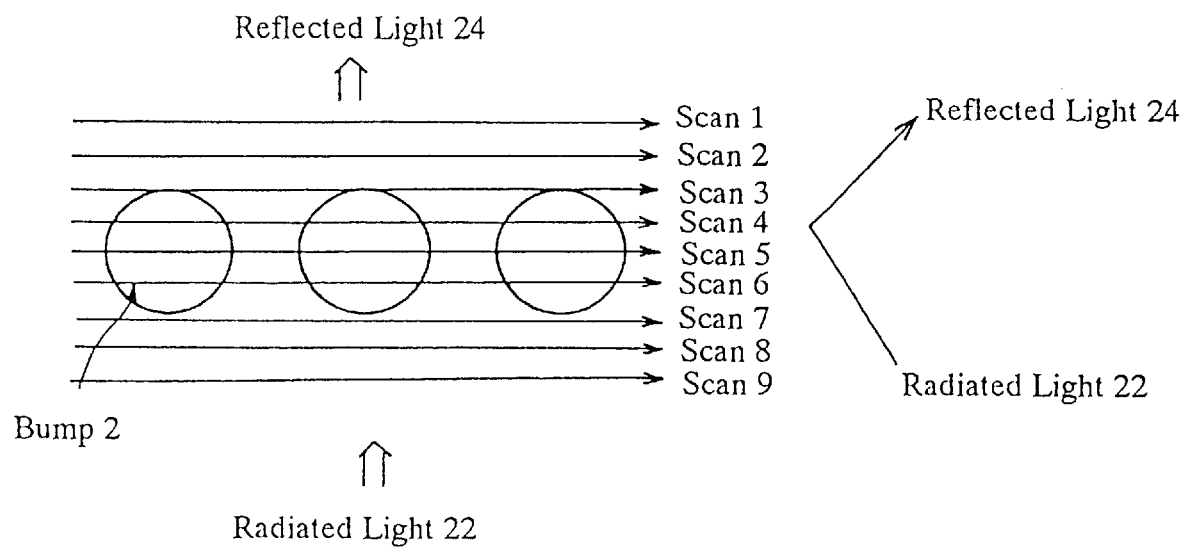
FIG. 3 is a plane diagram to explain the method for scanning bumps with a laser beam and detecting heights of bumps.
Figure 4:
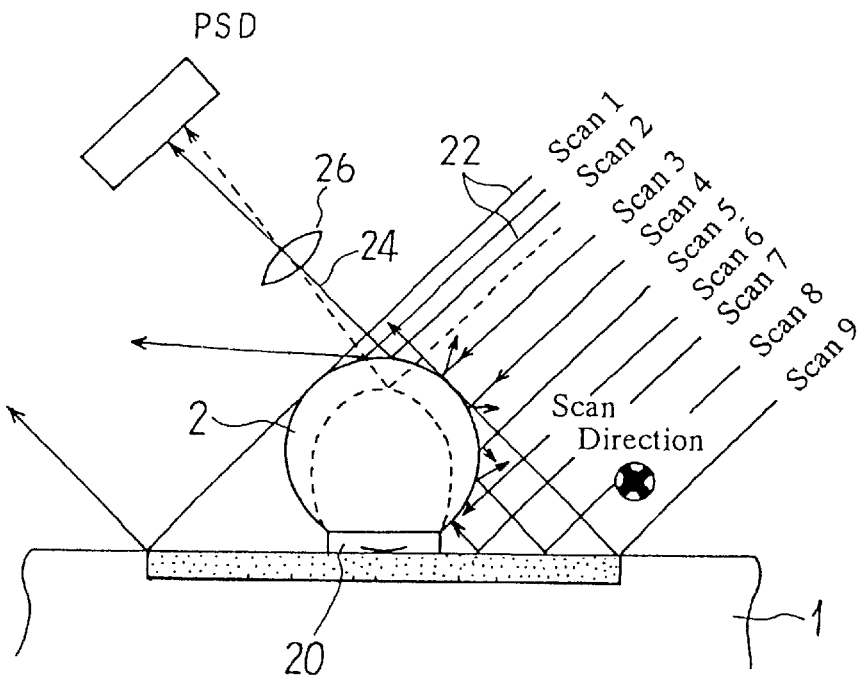
FIG. 4 is a side view to explain the method for scanning bumps with a laser beam and detecting heights of bumps.

FIG. 3 is a plane diagram to explain the method for scanning a bump with a laser beam and detecting the height of the bump. FIG. 4 is a side view thereof. In this example, in FIG. 3, the radiated light; 22 is radiated from the near side toward the figure and the reflected light 24 reflected by the bumps and chip surface is directed upwards. The radiated light is scanned in order from the upper side in FIG. 3.

The situation of the radiated light 22 and reflected light 24 in the vicinity of the bump 2 is understood with reference to FIG. 4. FIG. 4 shows from scan 1 to scan 9. In scan 1, the surface of the chip 1 is irradiated and reflects light without the bump 2 being irradiated. In scan 2, in this example, the radiated light 22 irradiates the apex of the bump 2 and the reflected light 24 passes through an objective lens 26 of the inspection device and shines on the PSD. As shown with the broken line, when the height of the bump 2 becomes low, the reflected light 24 is imaged at a different position on the PSD, which is the means for detecting light spot positions, and the height of the bump 2 is detected from the difference of that imaged light spot.

Furthermore, in scans 3 to 8, the reflected light becomes an irregular reflection because of the spherical form of the bump 2 and does not shine on the objective lens 26; the PSD can only detect a very dim light. In the same way, even in the case where the zone between scans 1 and 2 in FIG. 4 is scanned, the PSD can only detect a dim light as shown in the figure.

As discussed above, the disturbance of the reflected light and the position of the incident light are caused by the particular form, being the bump 2, but occur even in the case of the same type of particular form, which is not limited to semiconductor chip surfaces.

METHOD FOR MODULATING INTENSITY OF INCIDENT LIGHT

FIG. 5 is a graph to show the relationship between the intensity of radiated light and the quantity of light detected by the PSD when a bump 2, etc., is scanned as above. FIG. 5A shows the case where the intensity of the radiated light is constant with respect to the scanning position; FIG. 5B shows an example of the quantity of light detected at that time. Specifically, in the example in FIG. 4, the quantity of light detected as shown in FIG. 4 between scans 1 and 2 is very low, the quantity of light detected at scan 2 is very high, and only a very low quantity of light is detected in scans 3 to 8. Or, in scan 2, the quantity of light detected for portions other than the bump is low and becomes high at the apex of the bump. Consequently, the quantity of light detected varies greatly as shown in FIG. 5B. In the figure, Bt is a value in the center, for example, of the dynamic range of the photoelectric transduction element, such as the PSD. In order for action with good precision, it is desirable that the quantity of light detected be positioned in the vicinity of this central value Bt; at least it is necessary that the quantity of light detected be within the dynamic range.

Figure 5A:
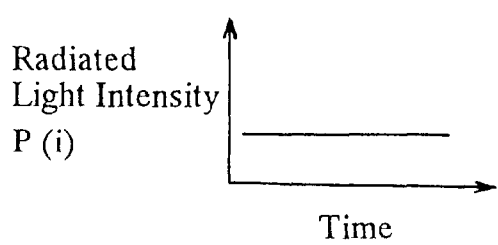
FIGS. 5A to 5D are a graph to show the relationship between the intensity of the radiated light and the quantity of light detected with the PSD.
Figure 5B:
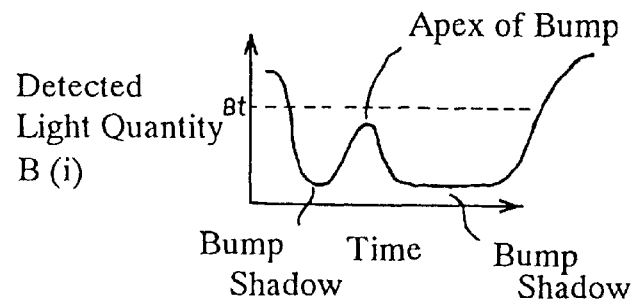
Figure 5C:
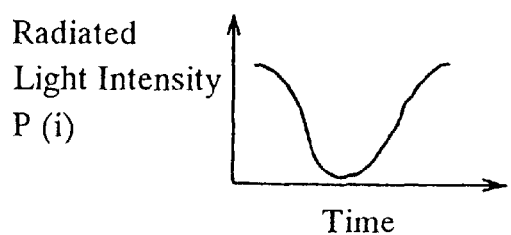
Figure 5D:
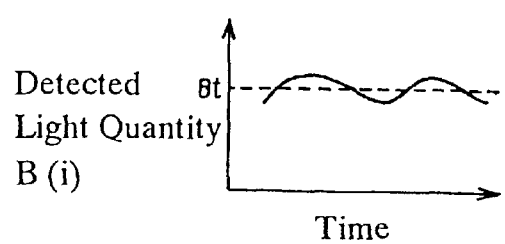

FIG. 5C shows an example of the intensity of radiated light varied according to the variations in the quantity of light detected. FIG. 5D shows the quantity of the detected light in case of FIG. 5C. As above, position detection with high precision becomes possible since the quantity of light detected is maintained in the vicinity of the central value Bt.

Modulation of the radiated light is generally effected in order to maintain the quantity of light detected as in FIGS. 5C and 5D. In other words, this is the method for modulating to find the intensity Pn+1(i) of the radiated light, such that the quantity of light detected in the next scan n+1 becomes the value Bt, based on the assumption that reflected light is detected at an equivalent reflectance in the next scan n+1 on the basis of the quantity of light detected Bn(i) for scan n. Specifically, the next intensity of radiated light Pn+1(i) is found with the following formula.

$$Pn+1(i)=Pn(i)\times Bt/Bn(i)$$

In other words, the radiation intensity Pn+1(i) of the next scan is found from the relationship of the quantity of light detected Bn(i) and the radiation intensity Pn(i) in the previous scan n.

Figure 6:
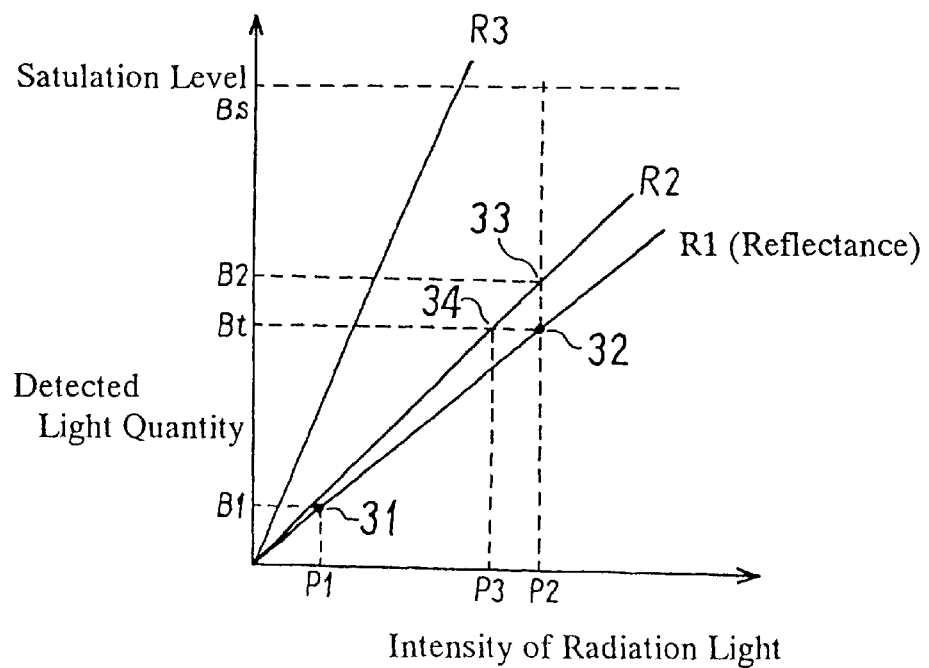
FIG. 6 is a drawing to explain the modulation method.

FIG. 6 is a figure to explain this modulation method. For example, when the quantity of light detected at radiation intensity P1 is B1 as at point 31, the reflectance at that time can be shown as R1. Consequently, the radiation intensity at the next scan 2 is modulated to P2 according to the modulation formula and in accord with point 32 where the quantity of light detected becomes Bt in the case of the same reflectance. In scan 2, when the quantity of light detected is B2 as at point 33, the reflectance at that time is R2. Then, radiation intensity at the next scan 3 becomes P3 as at point 34. With such a modulation method, it is unnecessary to effect a pre-scan before the main scan to determine radiation intensity. Optimum modulation can be effected without reducing the overall speed of scanning by just simply using the results of the previous scan and calculating the next radiation intensity.

However, inappropriate instances occur with such a modulation method in the case where the bumps are formed on the surface. In the case where radiated light is reflected by the apex of the bump, that reflectance becomes very high. Moreover, the scanning beam has a disturbed reflection and the PSD can only detect a dim (following) light, as discussed above, at scans preceding or following the apex of the bump. Consequently, as shown in FIG. 6, when a high reflectance such as R3 results from scanning with a radiation intensity of P3 in the next scan, the quantity of light detected B3 for the radiation intensity P3 theoretically becomes a value much greater than the saturation level Bs of the dynamic range. However, the quantity of light detected B3 actually becomes indeterminate because it exceeds the saturation level Bs. Consequently, it becomes impossible to calculate the radiation intensity in the next scan.

This problem occurs at the boundaries of aluminum wiring in areas other than the boundary portions of the bumps on the semiconductor chip, when using the modulation system to calculate and find the next radiation intensity from the quantity of light detected and the radiation intensity in the preceding scan, in order to decrease the total scanning time.

Figure 7:
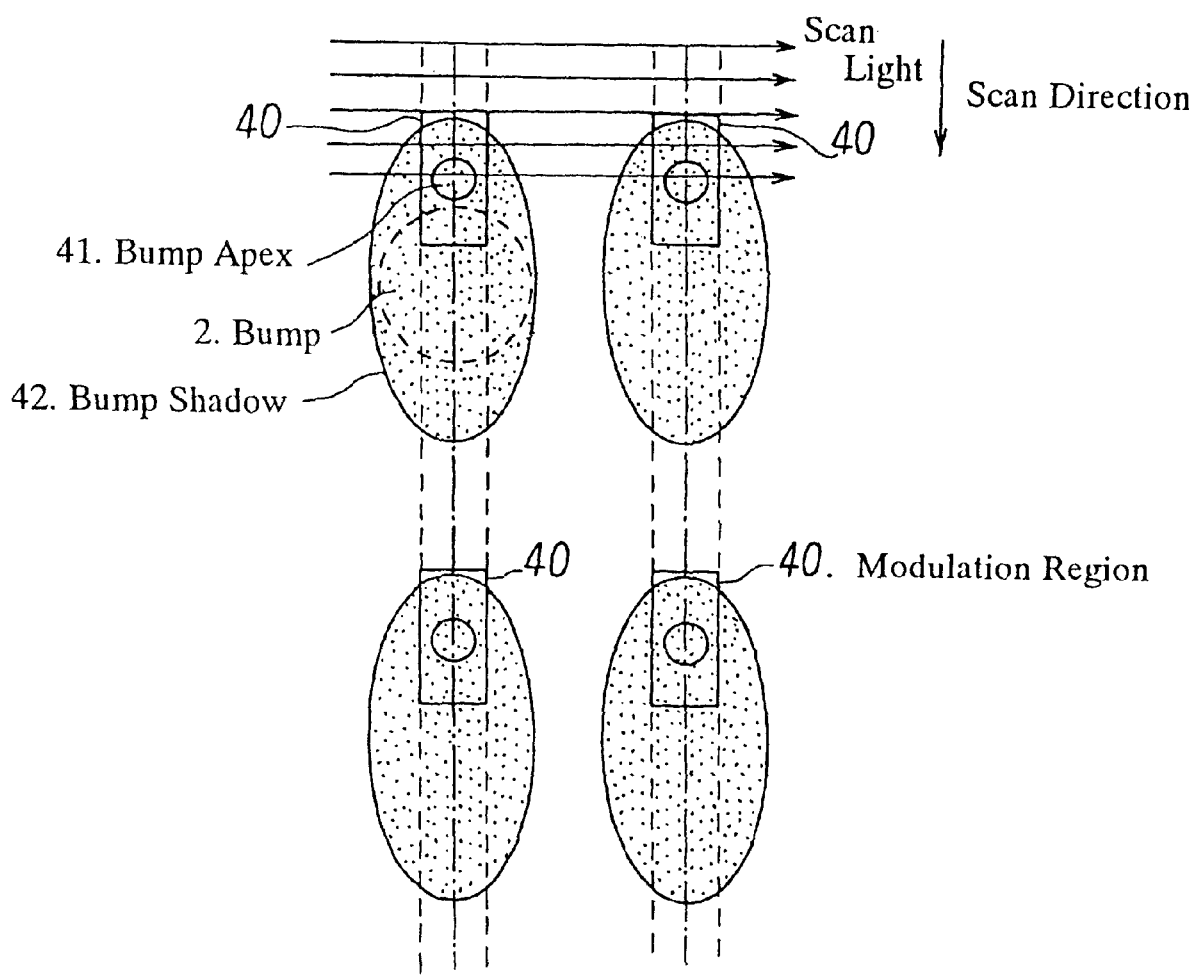
FIG. 7 is a drawing to show the distribution of the quantity of reflected light in the vicinity of the bump 2.

FIG. 7 is a figure to show the distribution of the quantity of reflected light in the vicinity of the bump 2 analyzed by the inventors. This is clear from the explanation with reference to FIG. 4, but the distribution of the quantity of reflected light is as follows: the high zone, with the greatest amount of light reflected by the bump apex 41, is at a position displaced somewhat upwards from the position of the actual bump 2, while around that is the dark zone of the bump shadow 42.

Consequently, for the scanning direction as shown in FIG. 7, it is effective to limit the modulation zone 40 to a rectangular zone including the periphery surrounding the bump apex 41, for example.

Modulation is effected in that modulation zone 40 using the modulation calculating formula discussed above. Furthermore, it is effective to change the modulation formula at the shadow portion 42 and the other apex portion 41 even within that modulation zone 40.

Figure 8:
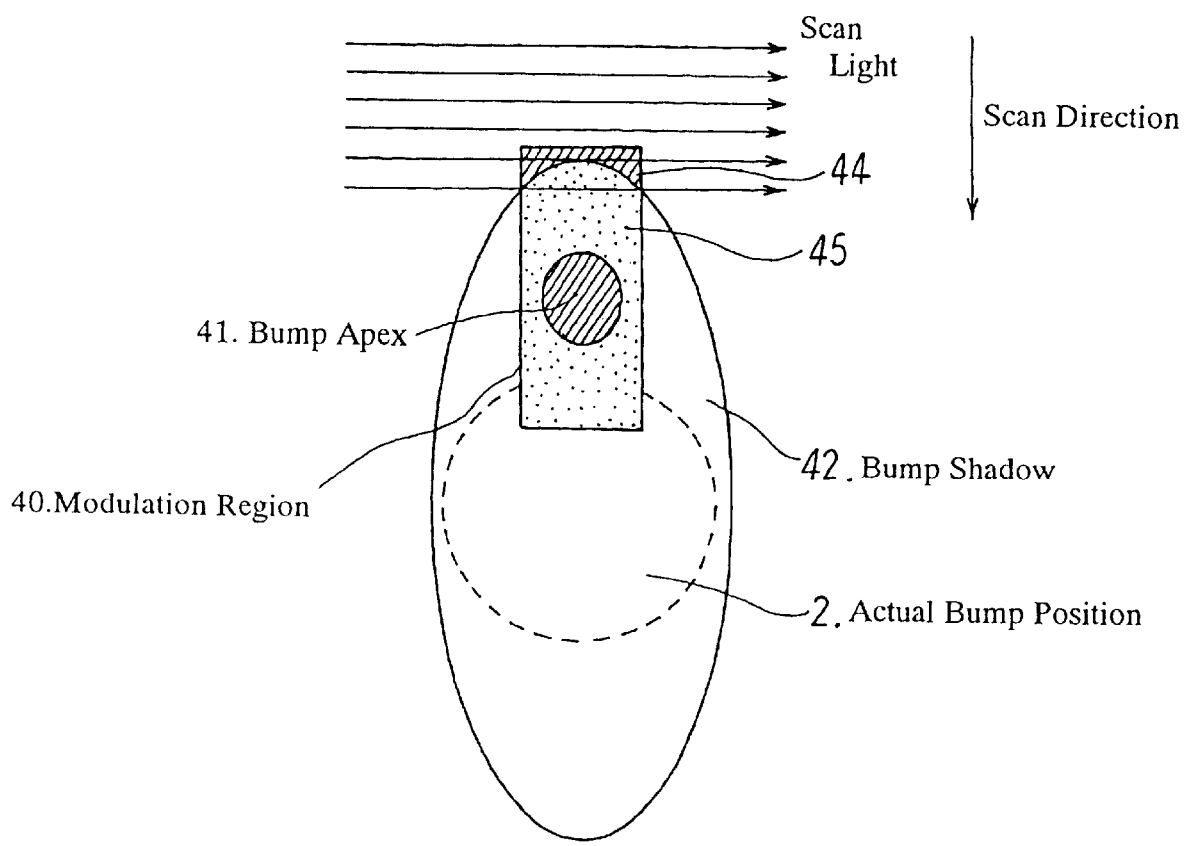
FIG. 8 is a detail of the modulation zone.

FIG. 8 is a detail of the modulation zone. When the modulation calculating formula in the modulation zone 40 is simply applied, the quantity of light detected is saturated at the boundary portion between the bump apex section 41 and the bump shadow section 42. In the present invention, attention is given to the point where a very dark shadow portion 42 is located, before and after the irradiation of the bump apex section 42. In the zone 45 pertaining to the shadow portion 42 in the modulation zone 40, a constant and weak radiation intensity P0 is used and scanning effected. In the zone of the bump apex 41, the radiation intensity is, as usual, modulated according to the modulation calculation discussed above. Also, the modulation calculation is applied as usual even in the modulation zone 44 outside the bump shadow 42.

Figure 9:
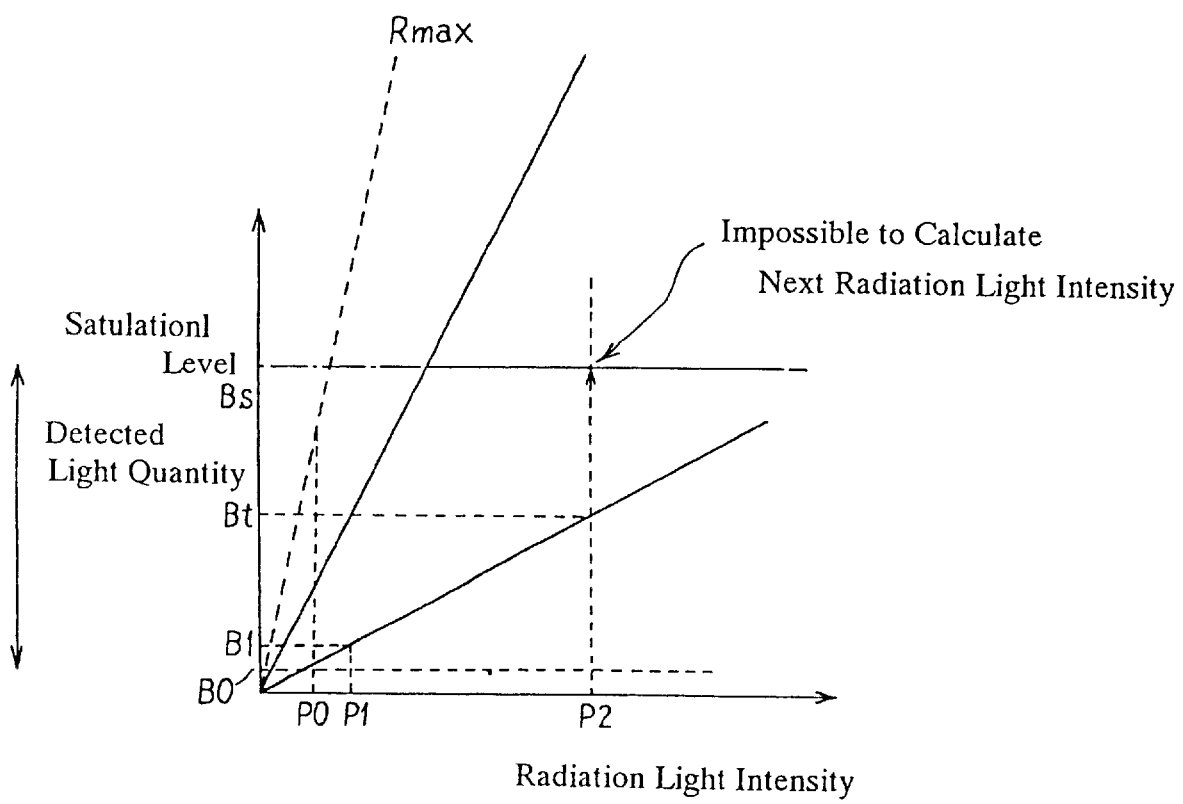
FIG. 9 is a drawing to show the relationship of the quantity of light detected and the radiation intensity to explain the modulation method relating to the present invention.

FIG. 9 is a figure to show the relationship between the detected light quantity and radiation light intensity to explain the modulation method relating to the present invention. In FIG. 8, scanning is effected from top to bottom. In that case, when scanning enters the modulation zone 40, the initial radiation intensity is set to the value P0 so that the quantity of light detected does not exceed the saturation level Bs of the PSD, which is the position sensitive detector, even when the portion having the highest reflection in the chip is irradiated. As shown in FIG. 9, the value P0 is selected so that the saturation level Bs is not exceeded even at the highest reflectance Rmax. With this radiation intensity P0, the PSD is not saturated even though the bump apex 41 is irradiated first, for example. Then, in the case where the quantity of light detected of the preceding scan is lower than the prescribed threshold value B0, the area scanned is determined to be the bump shadow zone 42 and the next radiation intensity is set to P0 as well. Consequently, the threshold value B0 is set to a value lower than the quantity of reflected light detected from the portion of the bump shadow 42.

As a result, as explained with the example in FIG. 8, the radiation intensity P(i) in zone 44 is usually established with the calculation formula discussed above. In due course, the scanning reaches the bump shadow zone 45, whereupon the quantity of light detected B(i) becomes less than the threshold value B0. As a result, the radiation intensity P(i) in the next scan is forcibly set to P0. Afterwards, when th e scanning reaches the bump apex zone 41, the quantity of light detected B(i) becomes high due to the high reflectance thereof. However, as discussed above, the Bn(i) in the calculation formula does not become indeterminate because the quantity of light detected B(i) for the radiation intensity P0 is never greater than the saturation level Bs. In the bump apex zone 41, the radiation intensity for the next scan is modulated with the calculation formula as it is and the PSD can detect the light spot with a quantity of light detected within the dynamic range.

The height of the bump apex is detected according to the light spot when light reflected from the bump apex is imaged on the PSD.

Furthermore, forcibly setting the radiation intensity P(i) to zero in zones other than the modulation zone 40 makes it unnecessary to perform wasteful calculations and the height inspection step can be shortened still further.

In order to set the modulation zone 40 to an appropriate position for the position of the bump 2, the present invention refers to CAD data which houses the surface pattern data of the semiconductor chip, along with scanning the radiated light. In other words, the position on a scanned chip can be found by the height detection device since the starting point of a scan and scanning pitch are determined in advance. Consequently, a reference to CAD data can determine whether or not the apparatus is scanning the modulation zone 40, which is a prescribed zone in the vicinity of the bump 2. Or, the current scanning position can be distinguished by using an imaging device such as a CCD camera and comparing the image of the scanning position to the CAD data.

Consequently, the radiation intensity is set to zero when zones other than the modulation zone 40 are scanned. Then, when the scanning position enters the modulation zone 40, scanning is started at an initial value of P0 and the next radiation intensity is calculated with the modulation calculation formula discussed above. Then, after the quantity of light detected falls below B0, the radiation intensity is set to P0 once more and the radiation intensity is maintained at P0 while the quantity of light detected falls below B0. In due time, when the scanning position enters the bump apex zone 41, the quantity of light detected rises above B0 due to the strong reflectance and the next radiation intensity is calculated with the modulation calculation formula once more. Then, when the bump shadow is entered once more, the quantity of light detected falls below B0 and the following radiation intensity is fixed at P0.

As above, with the present invention, saturation of the light spot position sensitive device can be suppressed to the utmost, since the modulation calculation formula is used only in the zone 41 very close to the bump apex. Also, since scanning is effected with the quantity of radiated light at P0 in the shadow sections 42, 45 surrounding the bump apex portion 41, modulation with the calculation formula can be effected normally in the apex portion 41 because the initial value of modulation of the bump apex portion 41 is usually stabilized at P0.

Figure 10:
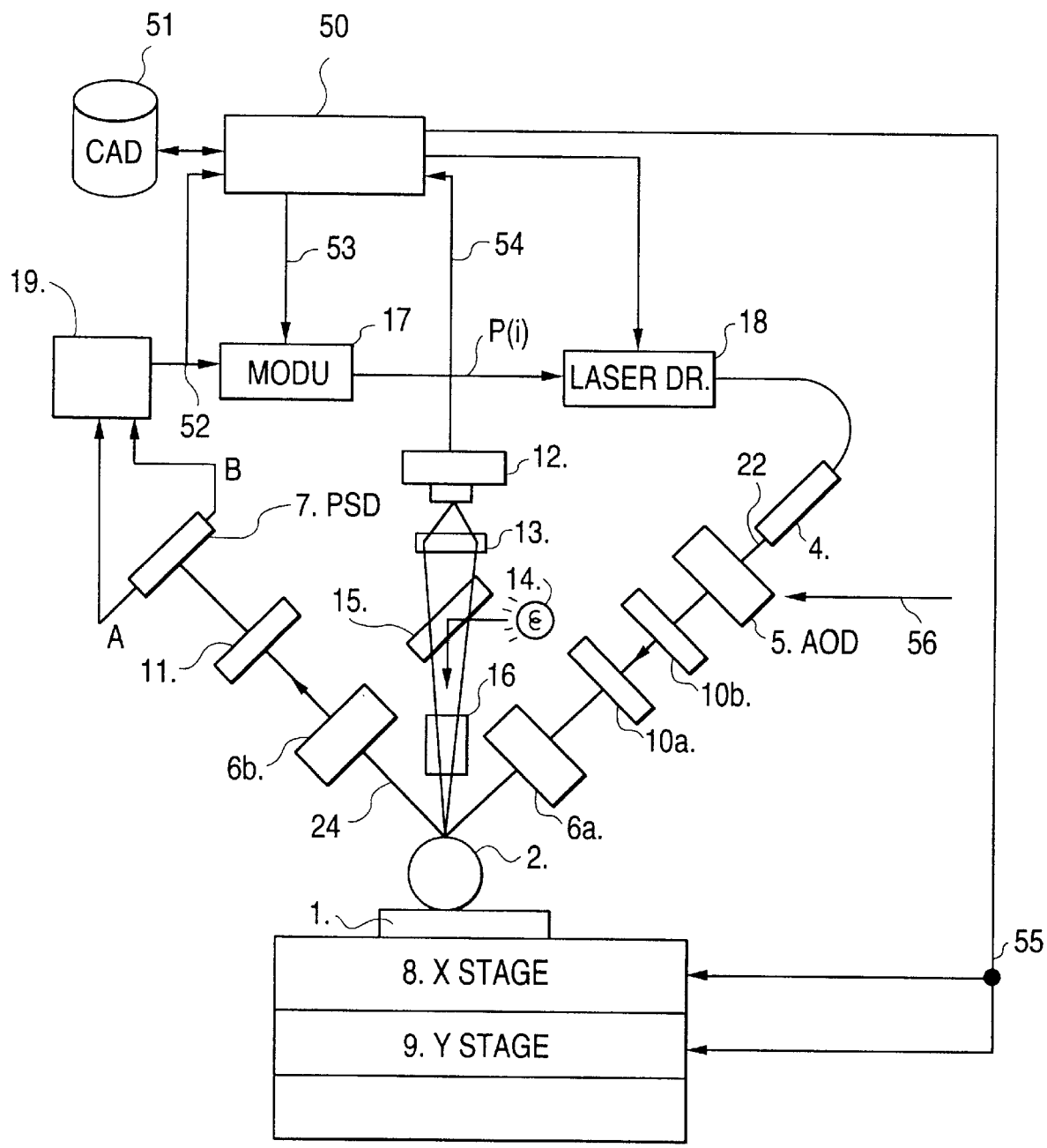
FIG. 10 is a drawing of the structure of a height inspection device, being an example of an embodiment of the present invention.

FIG. 10 shows the structure of the height inspection apparatus which is an embodiment for carrying out the present invention. In this example, a semiconductor chip 1 on which bumps 2 are formed is placed on a stage having an X stage 8 and a Y stage 9 which can be moved in the directions of the X and Y axes. Then, the radiated light 22 from the laser beam source 4 irradiates the surface of the chip 1 via an acousto-optic deflector (AOD) 5, lenses 10b, 10a and an objective lens 6a. In FIG. 10, the laser beam 22 irradiates the exact apex of the bump 2.

The reflected light 24 is imaged on the light spot position sensitive device PSD 7 via the objective lens 6b and imaging lens 11. When generally detecting line-oriented positions, the PSD 7 detects the light spot position according to the difference between photoelectric transduction current values A and B detected from the electrodes on the right and left. Also, the quantity of light detected is found with the sum of the current values A and B. In other words, the height of the inspected item and the quantity of reflected light are found with the height-quantity of light calculation circuit 19 in FIG. 10. The modulation circuit 17 finds the radiation intensity P(i) of the next scan with the modulation method discussed above according to the modulation ordering signal 53 from the control portion 50.

The laser driving circuit 18 drives the laser beam source 4 according to the radiation intensity P(i) found with the modulation circuit 17. 12 is a CCD camera and takes an image of the surface of the chip 1, being the inspected item, during scanning via the imaging lens 13, half mirror 15, and objective lens 16. The image data 54 taken is provided to the control portion 50.

The action of the height detection device is as follows. The X and Y stages are driven according to the stage driving signal 55 from the control portion 50 and cause the chip 1 to be moved to an appropriate scanning position. The surface image of the chip 1 at that time is captured with the CCD camera and provided to the control portion 50. In the control portion 50, CAD data is input from the file 51 of CAD data comprising the chip surface pattern and the scanning position in relation to the bump 2 is detected.

For a zone other than the deflection zone, the modulation circuit is instructed by the ordering signal 53 to forcibly set the radiation intensity to zero. Also, upon arriving at a deflection zone, it is instructed by the ordering signal 53 to set the radiation intensity to P0 as an initial value. Then, the laser driving circuit 18 drives the laser beam source 4 according to the driving signal which is in accord with the radiation intensity P(i); and the laser beam is generated. Then, the deflector 5 is driven according to the scanning signal 56 from the control portion 50; the radiated laser beam 22 is deflected horizontally; and the chip surface is scanned.

Then, the reflected light 24 at that time is imaged on the PSD 7 and height is detected. The height data and the quantity of light detected data 52 found with the height, quantity of light calculation circuit 19 are provided to the control portion 50. Meanwhile, in the modulation circuit, it is determined whether the quantity of light detected is lower than the threshold value B0. If greater than the threshold value B0 and lower than the saturation level Bs, the radiation intensity P(i) for the next scan is found according to the modulation calculation formula as usual. Also, if the quantity of light detected is lower than the threshold value B0 or greater than the saturation level Bs, the next radiation intensity is forcibly set to P0. Specifically:

$$Pn+1(i)=Pn(i)\times Bt/Bn(i) \quad (B0 \leq Bn(i) \leq Bs)$$

or $$Pn+1(i)=P0 \quad (Bn(i)<B0, Bn(i)>Bs)$$

With such a modulation method, the radiation intensity P(i) of the next scan is provided to the laser driving circuit 18 by the modulation circuit 17. Of course, the radiation intensity may be found without the calculation being effected with the calculation formula every time and instead may be found through referencing table values in a look up table, in accord with the calculation formula and prepared in advance, which is prepared in the modulation circuit 17.

Figure 11:
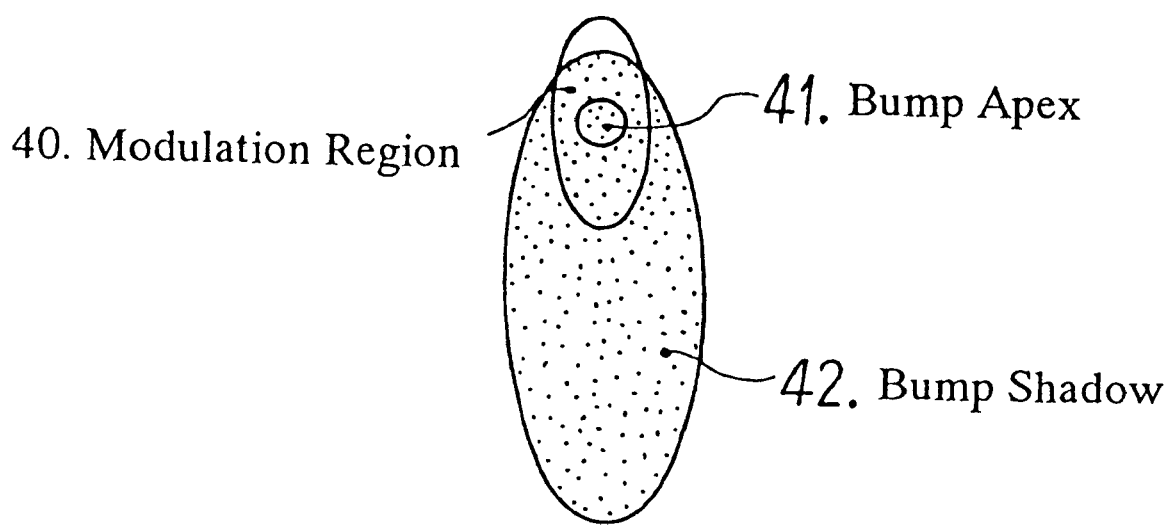
FIG. 11 is a drawing of another example of the modulation zone.

FIG. 11 is a figure to show another example of the modulation zone. In this example, an oval zone around the bump apex zone 41 is the modulation zone 40. The modulation zone 40 is different, but the modulation method is applied without any changes. The size of the modulation zone 40 must be such that that the bump apex 41 falls within the modulation zone 40 even though changes in apex position occur to a degree in accord with the position of the scanning beam, reflected with the bump apex, changing when bump size varies and the position of the apex changes. In other words, as shown in FIG. 4, the scanning beam reflected with the bump apex becomes the scanning beam having a different position, as shown by the broken line, when the bump size decreases.

With this embodiment, this is mainly an explanation of the method for modulating reflected light when detecting the height of a bump terminal on the surface of a semiconductor chip. However, this can be applied to other items having irregular surfaces and on which zones of different reflectance are distributed. Especially in the case where zones having very high reflectance are adjacent to zones having very low reflectance, forcibly setting radiation intensity to P0 in zones of low reflectance prevents the quantity of light detected exceeding the saturation zone of the light spot position sensitive detector, such as a PSD, and becoming indeterminate at the boundary with zones having high reflectance. Then, optimum height detection can be effected in zones having high reflectance by determining the radiation intensity of the next scan based on the quantity of light detected during the preceding scan according to the calculation formula discussed above.

CORRECTION OF DETECTED HEIGHT

In the above embodiment, height inspection is effected by modulating incident light intensity corresponding to variations in reflected light intensity caused by the surface form of the bumps. Next, the method for correcting errors in detected height caused by the bumps having a curved surface is explained.

Figure 12:
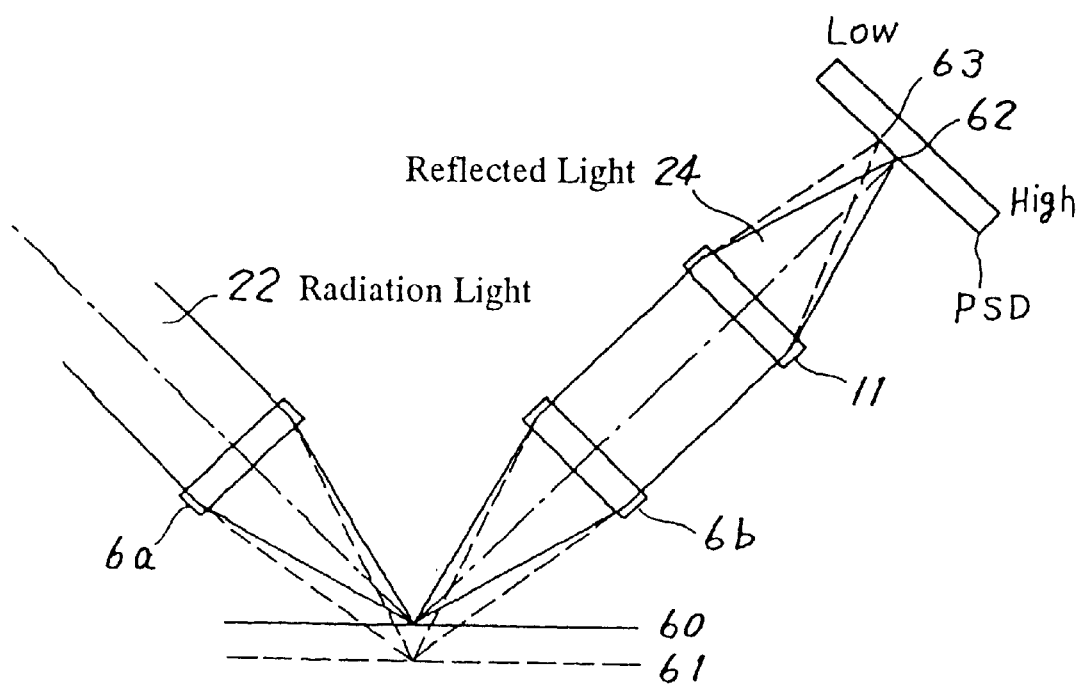
FIG. 12 is a drawing to explain the theory of the triangulation method.

FIG. 12 is a figure to explain the theory of triangulation. The triangulation method is generally as explained in FIG. 4. As shown in FIG. 12, radiation light 22, which is incident light from the left side, irradiates the measured surface 60, 61 via the objective lens 6a. Then, the reflected light 24 reflected by that measured surface 60, 61 is imaged on the surface of the light spot position sensitive device PSD by way of the objective lens 6b and the imaging lens 11. While the light spot position for the measured surface 60 becomes position 62, the light spot position of the measured surface 61 becomes position 63. In the case where the measure surface is at a position greater than 60, the light spot position becomes higher than 62. In this way, theoretically the position on the Z axis of the stage on which the measured item is mounted is fixed and the length of the optical path is fixed; and the height thereof is detected with the triangulation method from differences in light spot position imaged on the light spot position sensitive detector PSD according to differences in height. Because the stage does not concurrently move on the Z axis, it is possible to inspect the heights of a large number of bumps in a short time, just by scanning radiated light with the acousto-optic deflector.

However, errors occur in the detected height due to various factors because the surface form of the bumps is curved. For example, in the case of inspecting height with the triangulation method, the optical system is initially adjusted to a focal position with respect to the inspected item, and then the optical system is fixed and height is measured according to the principle discussed above. In that case, the focal position of the optical system of the inspection apparatus varies in front of or rear of the surface of the inspected item. As a result, the height of the bump apex cannot be detected correctly.

Figure 13A:
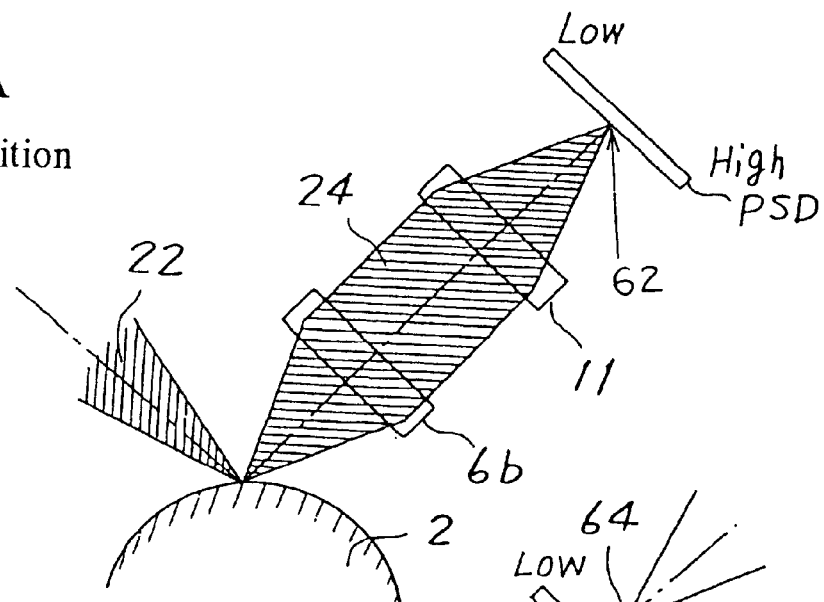
FIGS. 13A to 13C are a drawing to explain the problems with bump height measurement.
Figure 13B:
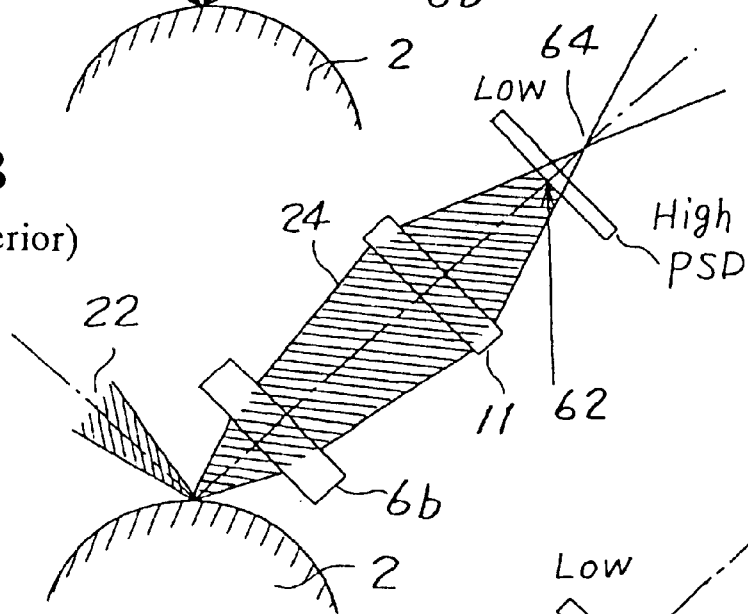
Figure 13C:
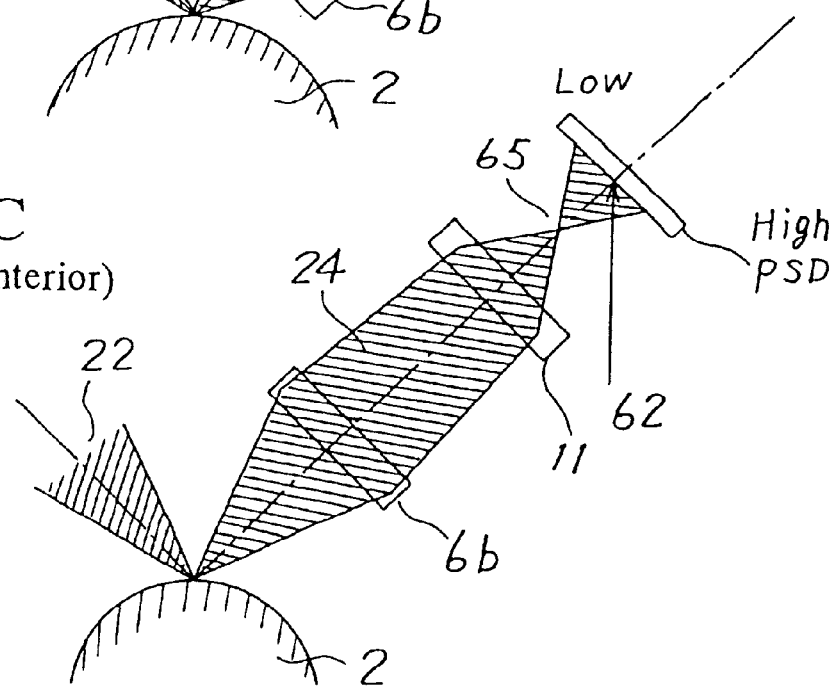

FIGS. 13 and 14 are figures to explain such a problem in measuring bump height. FIG. 13 shows the state in which the optical system is focused correctly on the light spot position sensitive detector PSD FIG. 13A; the state in which it is focused at a position 64 to the rear of the light spot position sensitive detector PSD FIG. 13B; and the state in which it is focused at a position 65 to the front of the light spot position sensitive detector PSD FIG. 13C, in the case where radiated light 22 irradiates the apex position of a bump 2.

FIG. 13A shows the case in which the optical system is established so that the apex of the bump 2 reflects the beam and the light spot is focused on the light spot position sensitive device PSD. As shown in the figure, the reflected light 24 reflected by the bump 2 apex is focused at the position 62 on the light spot position sensitive device PSD. Consequently, the height detected is the height corresponding to the position 62.

Meanwhile, in the case where the focal position of the optical system is the position 64 to the rear of the light spot position sensitive detector PSD as shown in FIG. 13B, the reflected light 24 is riot focused on the light spot position sensitive detector PSD. However, the light spot position sensitive detector PSD detects the center of gravity position of the light spot image with the calculation of $(a-b)/(a+b)$ for the signal a, b detected from terminals on both ends. Therefore, the detected height becomes the height corresponding to the position 62 in this case as well. Furthermore, in the case where the focal position of the optical system is the position 65 to the front of the light spot position sensitive detector PSD as in FIG. 13C, the detected height becomes the height corresponding to the position 62 in the same way.

In this way, in the case where the radiated light 22 is reflected by the apex of the bump 2, correct height detection is possible since this light is reflected uniformly even when displacement of the focal position of the optical system occurs. However, in the case where the radiated light 22 is reflected by a position displaced from the apex of the bump 2, errors occur in the detected height according to the displacement of the focal position of the optical system.

Figure 14A:
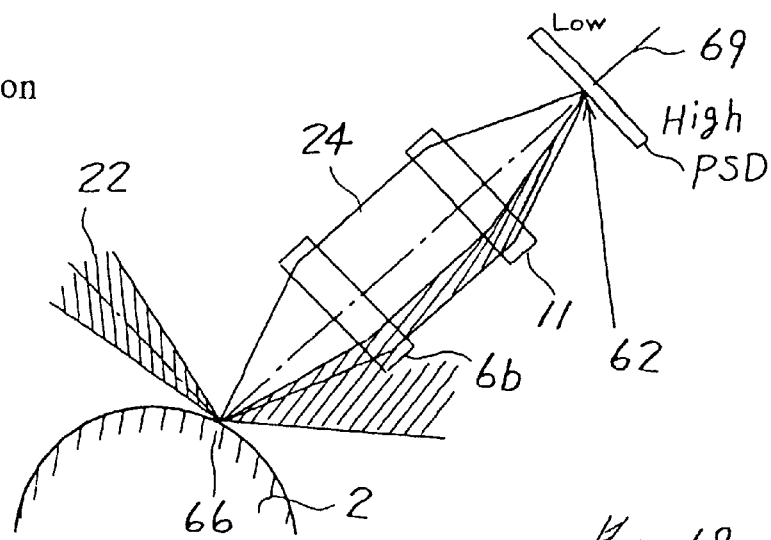
FIGS. 14A to 14C are a drawing to explain the problems with bump height measurement.
Figure 14B:
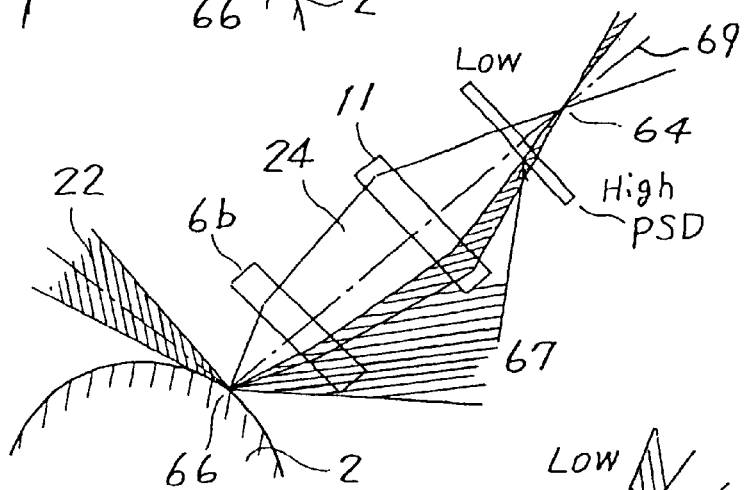
Figure 14C:
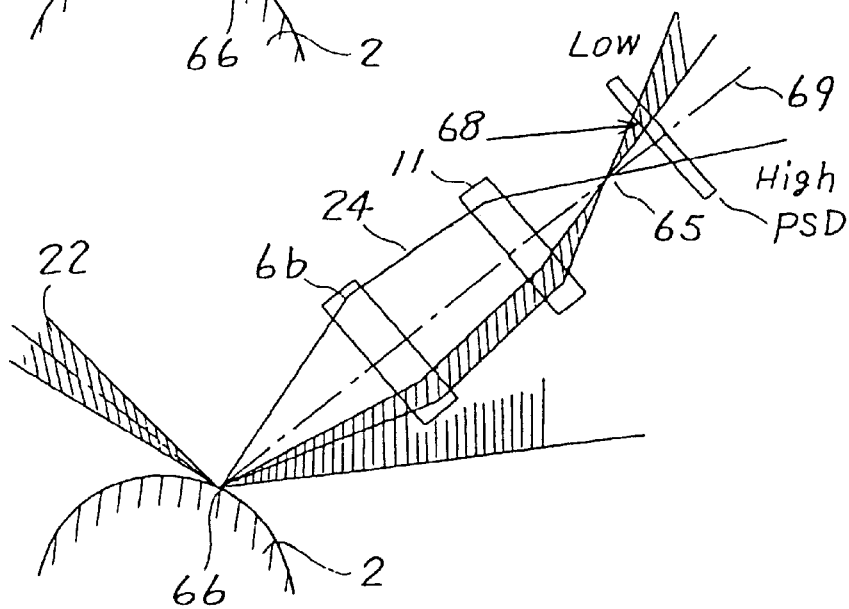

FIG. 14 shows the case where the radiated light 22 is reflected by a position 66 displaced from the apex of the bump 2. As in FIG. 13, FIG. 14A shows the case where the optical system is set so as to focus on the light spot position sensitive detector PSD; FIG. 14B shows the case where it is set to focus on a position 64 to the rear of the light spot position sensitive detector PSD; and FIG. 14C shows the case where it is set to focus on a position 65 to the front of the light spot position sensitive detector PSD. In the case where the radiated light 22 is reflected at a position 66 displaced from the apex of the bump 2, the reflected light 24 is characteristically deflected downward and not uniformly with respect to the optical axis 69.

In the case of FIG. 14A, the reflected light 24 is focused on the position 62 on the light spot position sensitive detector PSD. Even when the reflected light 24 is deflected downward as above, the center of gravity position of that light spot becomes the position 62 and the detected height becomes the height corresponding to that position 6 2. However, in the case of a posterior focal point as in FIG. 14B, the center of gravity position of the light spot detected on the light spot position sensitive detector PSD becomes the position 67 in the figure. As a result, the detected height becomes a higher value corresponding to the position 67. Consequently, the detected height becomes a higher value than the apex of the bump 2 even though the position 66 on the bump 2 is lower than the apex position. This means that an incorrect height of the bump apex is detected in the case where the radiated light 22 is scanned and the highest position is determined to be the apex position.

In the case of an anterior focal point as in FIG. 14C, the center of gravity position of the light spot detected on the light spot position sensitive detector PSD becomes the position 68 in the figure. As a result, the detected height becomes a lower value corresponding to that position 68.

In the case of detecting the height of multiple bumps with the triangulation method as above, the optical system of the height inspection device is fixed after that optical system is adjusted once, and height is detected according to the light spot position on the light spot position sensitive detector PSD. Consequently, when the optical system is fixed at an posterior focal point as in FIG. 14B, the height at a position 66 displaced from the apex is usually detected as higher. Oppositely, when the optical system is fixed at an anterior focal point as in FIG. 14C, the height at a position 66 displaced from the apex is usually detected as lower.

The following method is a means to avoid the problem shown in FIG. 14: when the intensity (signal a+b) of the light spot output by the light spot position sensitive device PSD is highest, it is determined that the radiated light is reflected by the bump apex, and then that height detection value is made the height of the apex. This method uses the fact that the intensity of the reflected light captured by the optical system on, the reflection side becomes strongest, because there is no slope such as at the position 66 in the case of reflection by the bump apex.

Figure 15A:
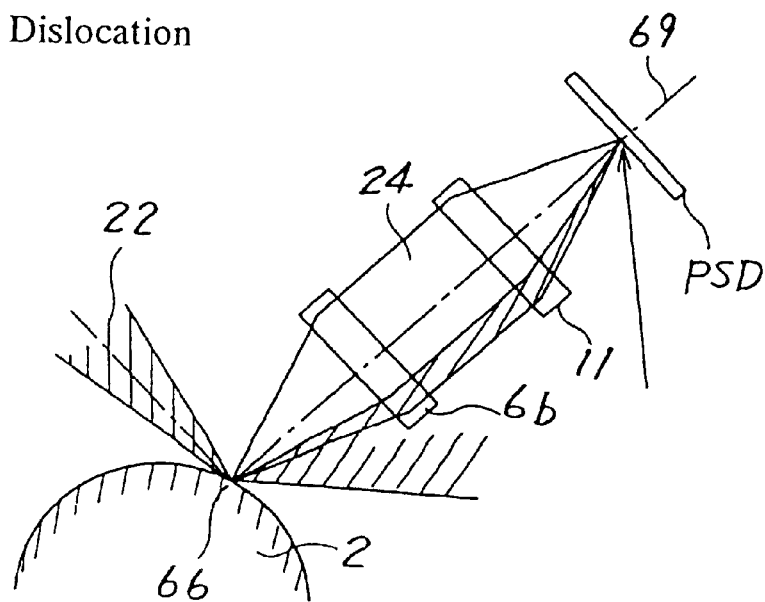
FIG. 15A and 15B are a drawing to explain the problems with bump height measurement.
Figure 15B:
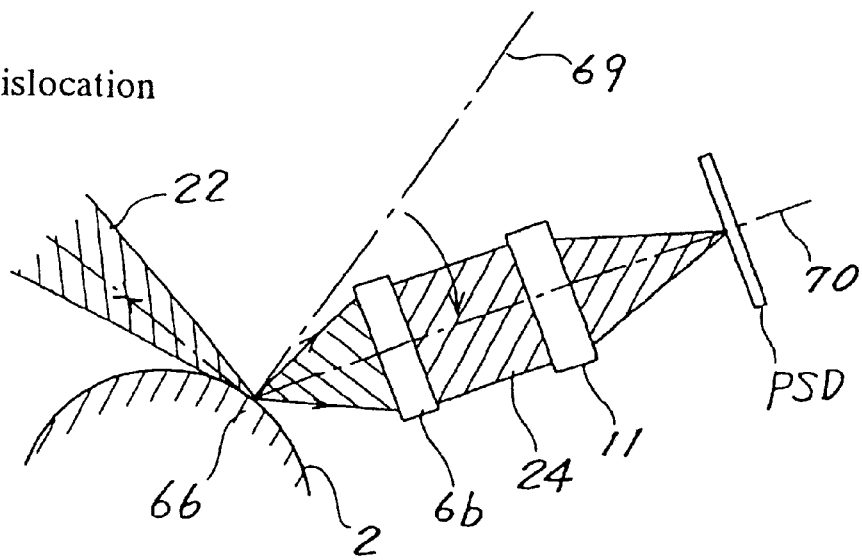

FIG. 15 is a figure to explain the method of detecting apex position using the intensity of reflected light as the key. In the case where the radiated light 22 is reflected by the position 66 displaced from the apex of the bump 2 as in FIG. 15A, the intensity (signal a+b) detected by the light spot position sensitive device PSD becomes less even than the case in FIG. 13A because the reflected light 24 is deflected downwards of the optical axis 69. Consequently, the position 66 is detected as a position other than bump apex. However, in the case where the optical axis of the optical system in the inspection device is dislocated, the intensity detected by the light spot position sensitive device PSD becomes the maximum when the radiated light is reflected by a position other than the apex of the bump 2. FIG. 15B shows the case where the optical axis 70 of the optical system on the reflection side is dislocated downwards from the original optical axis 69. In this case, the intensity (signal a+b) detected by the light spot position sensitive detector PSD becomes the maximum, because the reflected light 24 reflected by a position 66 other than the apex of the bump 2 becomes uniform with respect to the optical axis 7. Consequently, the position 66 is erroneously identified as the apex and the height of the position 66 is measured.

When there is a displacement of the optical axis of the optical system on the reflection side, as above, there is usually a tendency that a height lower than the apex is detected, in the case where height inspection is effected with the apex being the position where the intensity of the light spot detected by the light spot position sensitive detector PSD is at the maximum.

The height inspection apparatus of the present embodiment includes a portion for corrective height inspection in addition to the high speed height inspection apparatus using the triangulation method. A corrective conversion function is found from the correlation of a value X (second corrective height value) of height detected for a standard inspected item with the height inspection appratus and a value Y (first corrective height value) of height detected for the same standard inspected item with the portion for corrective height inspection. Then, when the height of real bumps is measured, the detection output X (measurement height value) from the high speed height inspection apparatus using the triangulation method is converted to the corrected value Y (corrected height value) with the conversion function. A measurement method in which errors, due to the curved form of the bumps, do not occur in the detected height is used in the portion for corrective height inspection. An example is the method in which the height of bumps is detected from the length of the optical path by moving the stage in the Z direction, changing the length of the optical path, and detecting the focal point.

Figure 16:
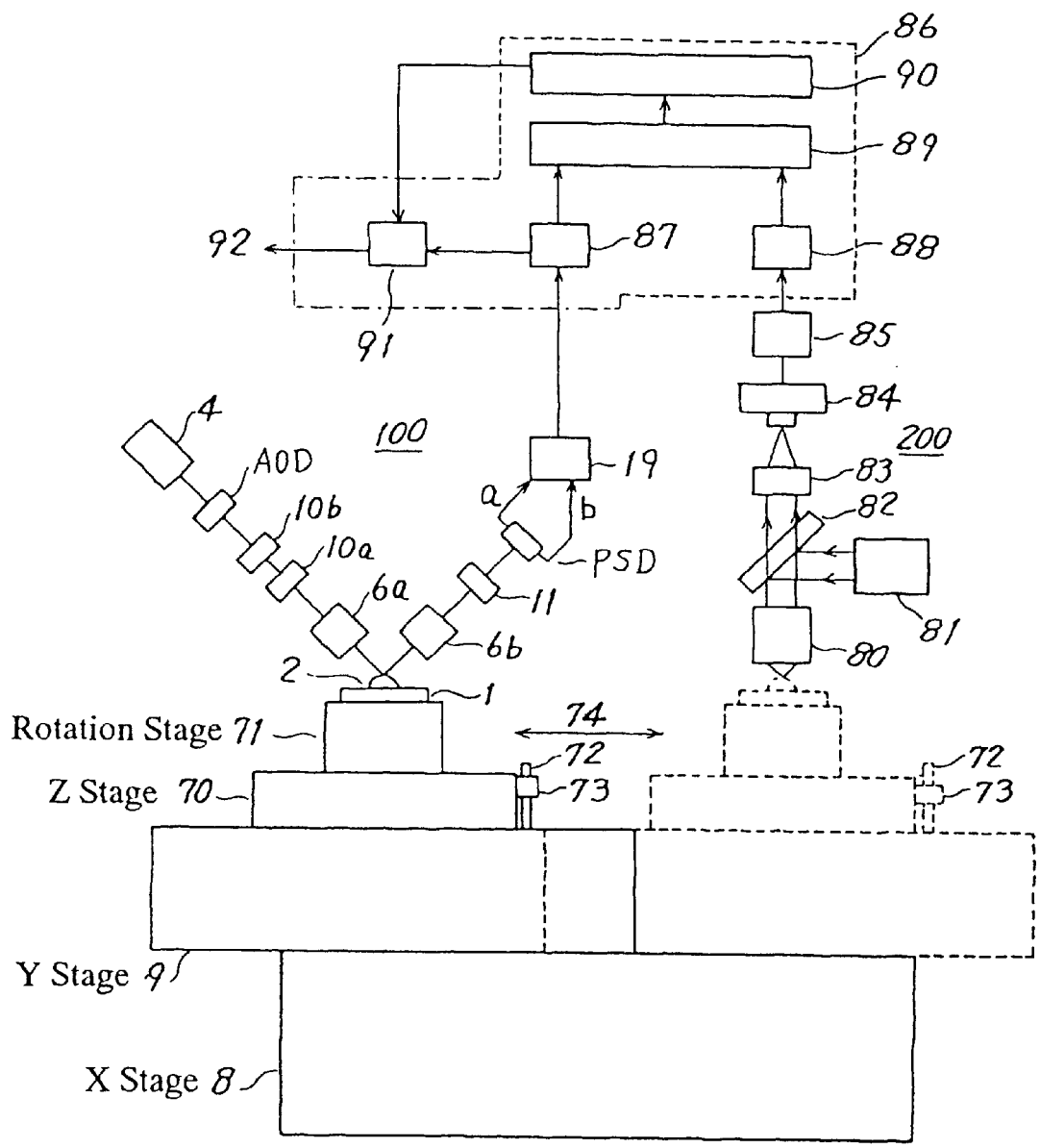
FIG. 16 is a drawing of the structure of a height inspection device, being an example of an embodiment of the present invention.

FIG. 16 shows the constitution of a height inspection apparatus of the present embodiment. In this example, a portion for corrective height inspection 200 is added to the height inspection apparatus 100 using the triangulation method shown in FIG. 10. Then, if the bump 2 on the same chip 1 can be measured with the height inspection apparatus 100 by the Y stage 9 on the X stage 8 being moved in the direction of the arrow 74, the height can also be inspected with the portion for corrective height inspection 200. The basic idea with the portion for corrective height inspection 200 is to change the position of the measured item in a perpendicular direction (Z axis) and measure the height of the measured item using the length of the optical path at the focal point. Accordingly, the Z stage 70 can be moved in a perpendicular direction; the scale 72 and the encoder 73 to read its graduations are established on the Z stage 70.

The height inspection apparatus 100 using the triangulation method is the same as shown in FIG. 10; the same reference numbers are applied to corresponding portions. In other words, radiated light from the laser diode 4 is deflected and scanned with the acousto-optic deflector AOD, and irradiates the bump 2 on the measured item via the lens 10*b*, 10*a* and the objective lens 6*a*. 19 is a height calculation portion to receive the signal a, b from the light spot position sensitive detector PSD and calculate height from the signal corresponding to the light spot position.

Meanwhile, in the portion for corrective height inspection 200, the radiated light from the light source 18 irradiates the bump 2, which is the measured item, via a half mirror 82. The reflected light passes through the half mirror 82, passes through an imagining lens 83, and is imaged on an imaging forming element 84, such as a CCD. Means for calculating height 85 effects control so that the surface of the inspected item becomes the focal position, while moving the Z stage 70 in a perpendicular direction. A determination is made regarding if this is the focal position, for example whether the light spot on the imaging forming element 84 becomes lowest (becomes sharp). Then, the scale is read from the encoder for the position of the Z stage when the focal position is reached. The height of the bump apex on the measured item can be measured by comparing this Z value to the standard Z value.

As above, the length of the optical path is changed and the focal position is found with the portion for corrective height inspection 200; height can be measured correctly without depending on the curved form of the bump since the height of the measured item is detected from that length of the optical path. However, measurement time is long because it is necessary to move the Z stage.

Figure 17:
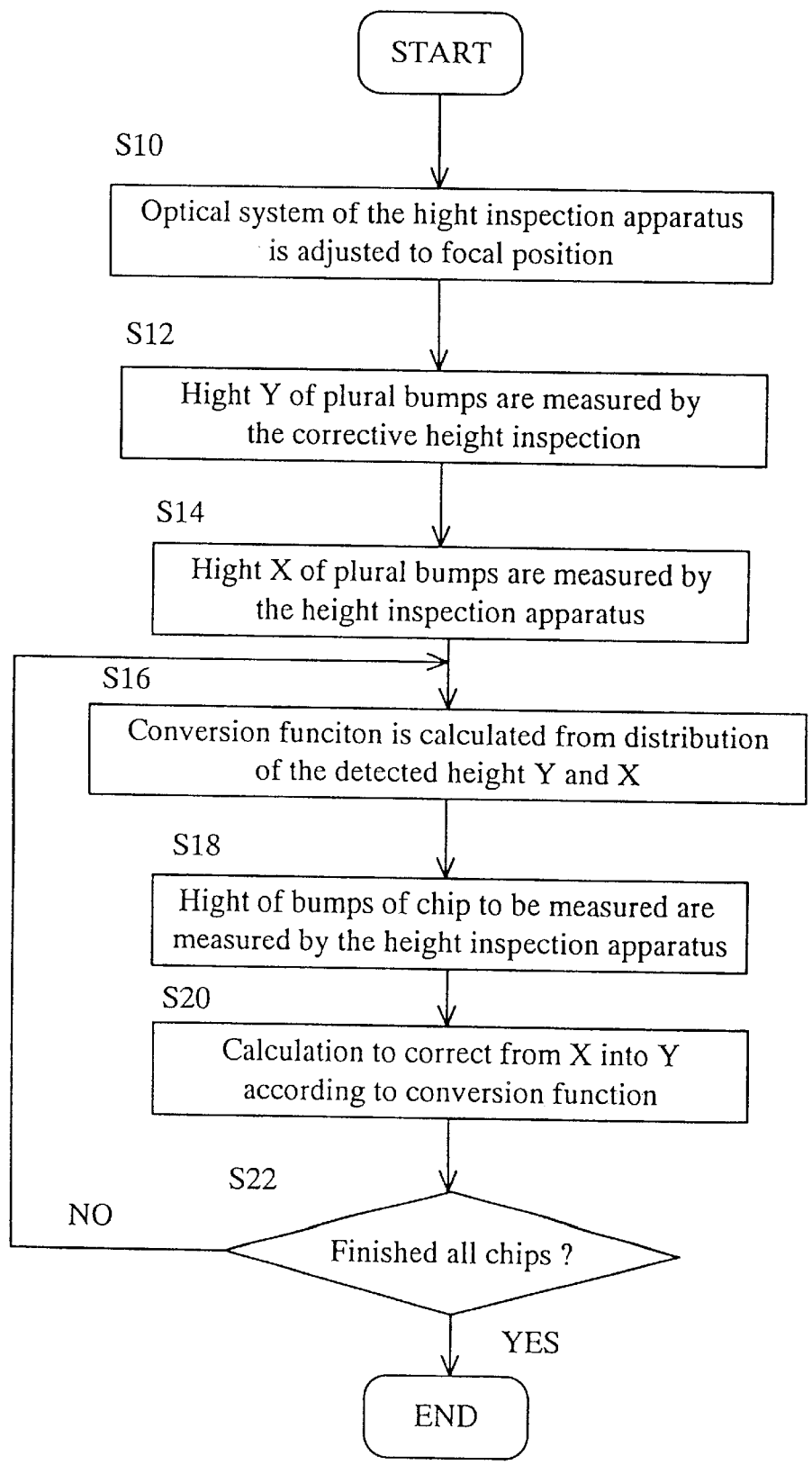
FIG. 17 is a flowchart of measurement using the height measurement device in FIG. 16.

FIG. 17 is a flow chart the measurement using the height measurement apparatus in FIG. 16. First, the optical system of the height inspection apparatus 100 using the triangulation method is adjusted to the focal position S10. In other words, the position of the lens of the optical system and the position of the Z stage 70, etc., are adjusted so that the reflected light reflected by the standard measured item is focused on the surface of the light spot position sensitive detector PSD. As a result, the optical system is set to a focal position, or somewhat anterior focal point or posterior focal point.

The Y stage 9 is moved to the right in the direction of the arrow 74 and the bump 2 of the standard measured object is placed below the portion for corrective height inspection 200. Then, the position where the light spot image, imaged by the image forming element 84, becomes sharpest or smallest is found while the Z stage is moved in a perpendicular direction. The height Y of the bump 2 is calculated by the means for calculating means 85 from the Z value at that time S12. This height Y is found for a plurality of bumps. That height Y found is stored in the memory 88 for storing height results.

Next, the Y stage 9 is moved to the left in the direction of the arrow 74 and the height X of a plurality of bumps 2 on the same standard measured object is measured with the height inspection apparatus 100 S14. At this time, the focal position of the optical system remains as adjusted in Step S10. The measurement results X are stored in the memory 87 for storing height results.

In FIG. 16, the broken line section 86 is a height calculation portion constituted of a microcomputer or personal computer, for example. In the portion for calculating height 86, the values of the heights Y and X detected with both inspection device 100 and 200 are read from memory 88 and 87, the relationship of the heights X and Y is found with the means for correcting height data 89, and the relational expression of both values is found with the method of least squares, for example, from the distribution of the heights X and Y for a plurality of bumps.

Figure 18:
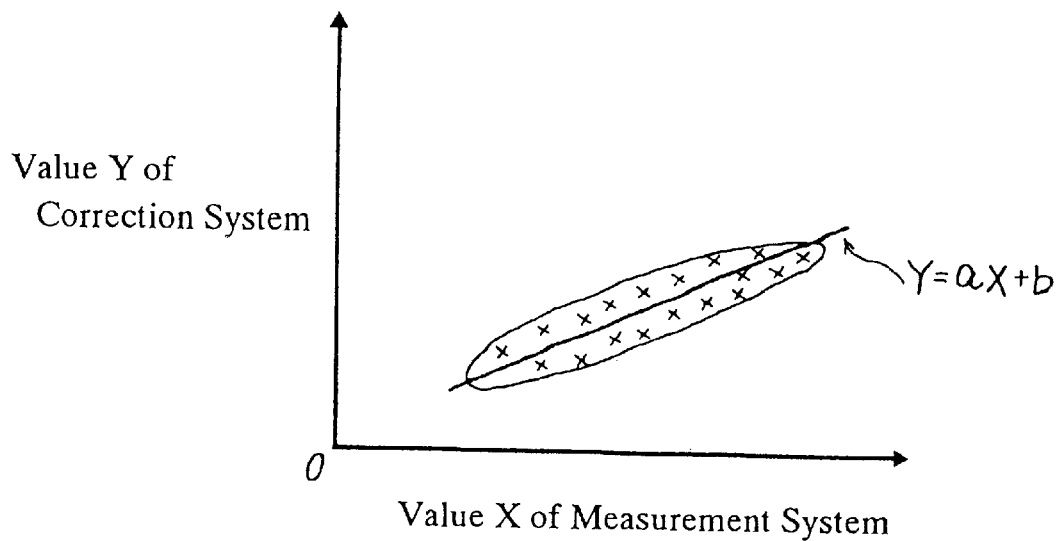
FIG. 18 is a drawing to show an example of a conversion function for correction.
Figure 19:
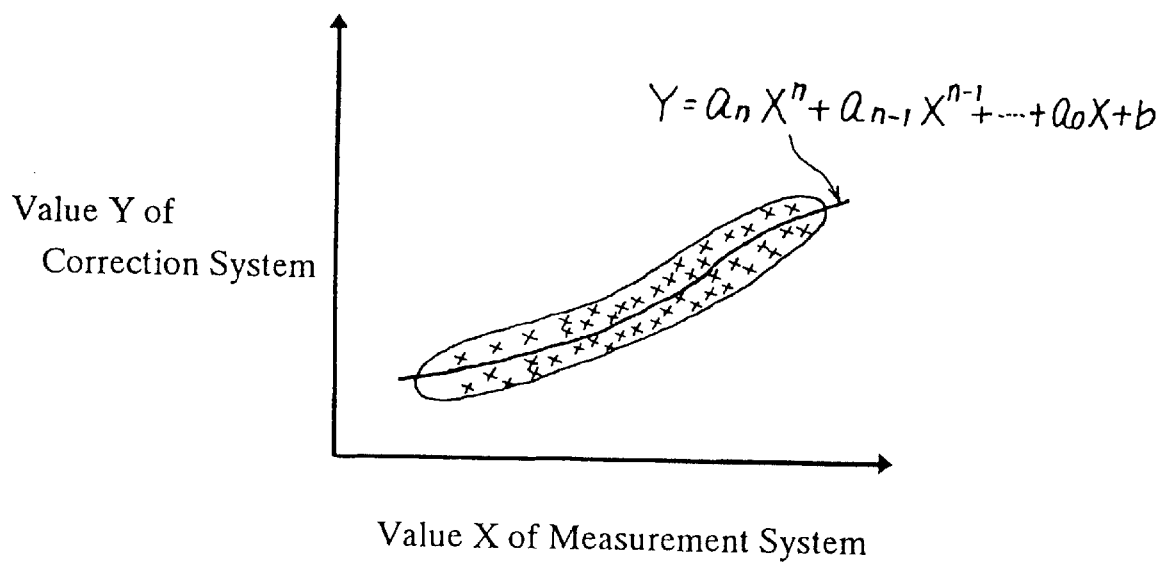
FIG. 19 is a drawing to show an example of a conversion function for correction.

FIG. 18 shows an example where a relational expression, a linear function of Y=aX+b, is found with the method of least squares. The values X measured with the measurement system and the values Y measured with the correction system are plotted and an approximate relational expression is found from the distribution thereof. FIG. 19 shows an example of finding the multidimensional function $$Y=a_n X^n + a_{n-1} X^{n-1} + \ldots + a_0 X + b$$

with the method of least squares. As above, once the optical system on the height inspection device 100 is set, errors in the height X detected with that optical system have a constant slope. Consequently, a constant relational expression is found from the distribution of both values X and Y S16 as in FIG. 18 and 19. This relational expression is stored in memory 90 as a conversion function or conversion table.

Afterwards, for a plurality of chips 1 to be measured, measurement of the height of the bump 2 is effected with the triangulation method as discussed above with the height inspection device 100 (S18).

The height value X, calculated from the signal from the light spot position sensitive detector PSD with the means for calculating 19, is converted to the value Y corrected according to the conversion function or conversion table, with the means for correcting height 91, and output as the corrected height value 92 (S20). These steps S18 and S20 are effected until measurement of all chips to be measured is complete (S22).

Once the optical system of the height inspection device 100 is reset, the steps S102 to S16 are effected once more and a new conversion function is found. Then, subsequent measurement is corrected according to the newly found conversion function.

In the example above, the conversion function is found from the relationship of the measured values X and Y, but a table of corrected values and measured values as in FIG. 20 may also be prepared and stored in memory 90. In that case, it is necessary to find the corrected value Y by linear interpolation or spline interpolation, etc., from the values in the table with the means for correcting height 91.

Figure 21:
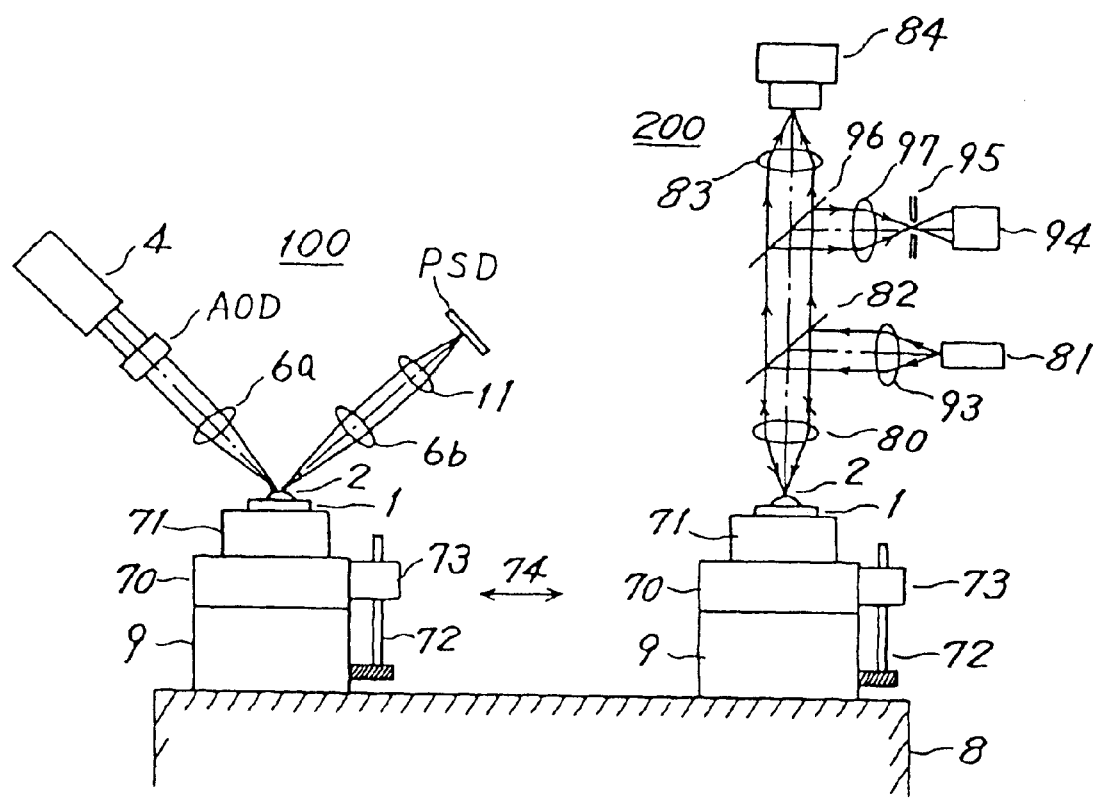
FIG. 21 is a drawing to show another example of a height inspection device, being an embodiment of the present invention.

FIG. 21 is a figure to show another example of the height inspection device in the present embodiment. The same references are applied to portions which are the same as the height inspection device in FIG. 16. In this example, the height inspection device 100 of the measurement system is the same as in FIG. 16. The height measurement portion 200 in the correction system shown in FIG. 16 detects the value at which the light spot of light reflected from the measured item becomes smallest or sharp as the focal position. Meanwhile, in the height measurement portion 200 in the correction system in the example in FIG. 21, the reflected light from the measured item is reflected by the half mirror 96 and the quantity of reflected light passing through the imaging lens 97 and the slit 95 is monitored with the means for detecting quantity of light 94.

The means for detecting quantity of light 94 detects the maximum quantity of light when the light reflected by the bump 2 is focused at the slit 95. Meanwhile, the quantity of reflected light passing through the slit 95 is reduced when the reflected light is focused to the front or rear of the slit 95; therefore, the means for detecting quantity of light 94 detects a small quantity of light. Consequently, a Z value in a focused state can be attained by reading the Z value, at the time when the output of the means for detecting quantity of light 94 reaches the peak value, from the scale 72 with the encoder 73 while the Z stage 97 is moved in a vertical direction. The corrected value Y of detected height can be attained from that Z value.

In the height detection portion 200 of the correction system shown in FIG. 21 as well, the Z stage is moved, the length of the optical path changed, and focal position detected, and the height of the measured item is detected. In other words, this is theoretically the same as the height detection portion 200 of the correction system in FIG. 16.

Figure 22:
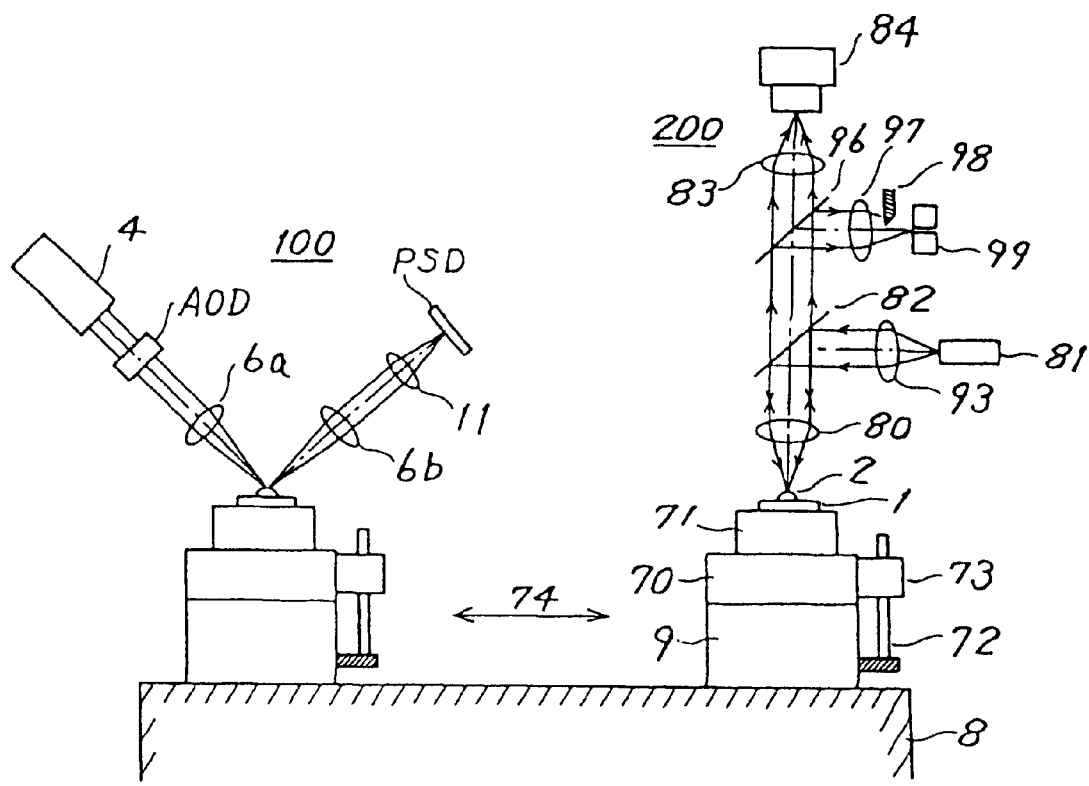
FIG. 22 is a drawing to show another example of a height inspection device, being an embodiment of the present invention.

FIG. 22 shows another example of the height inspection device of the present embodiment. The same references are applied to portions which are the same as the height inspection device in FIGS. 16 and 21. In this example, the height inspection device 100 of the measurement system is the same as in FIGS. 16 and 21. In the height detection portion 200 of the correction system in the example in FIG. 22, a knife Ledge 98 is installed instead of the slit in FIG. 21 and a split photodiode 99 is installed instead of the means for detecting quantity of light. The knife edge 98 is installed at a position where it blocks the upper half of the reflected light. Consequently, when the reflected light is focused at the position of the knife edge 98, all the reflected light is sharply imaged at the center of the split photodiode 99. Meanwhile, when the reflected light is focused to the front or rear of the knife edge 98, the upper half of that reflected light is blocked with the knife edge 98. Consequently, the center of gravity of the light spot moves to the lower photodiode in the split photodiode 99.

When the signal a–b from the split photodiode 99 is monitored in this way, the reflected light is detected to be at the focal position when a–b=0. Consequently, the Z value at the focal position can be found by monitoring the signal a–b from the split photodiode 99 and detecting the Z value where that signal becomes a–b=0, while the Z stage is moved vertically. Consequently, in the case of FIG. 22 as well, the theory of measuring height by changing the length of the optical path and detecting the focal position is the same as in the cases in FIGS. 16 and 21.

Figure 23:
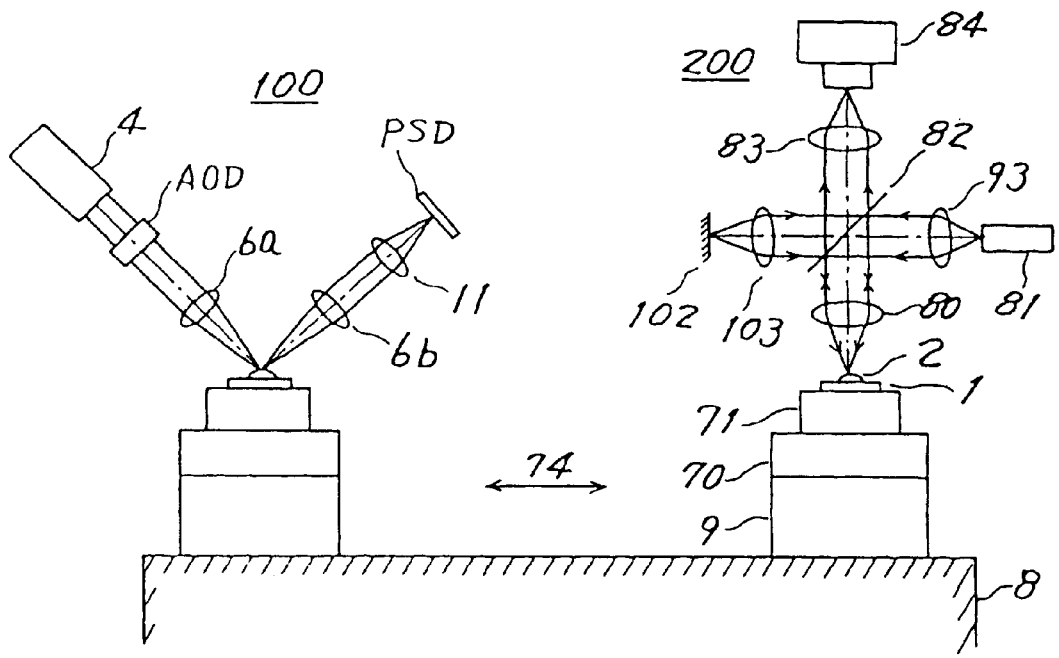
FIG. 23 is a drawing to show another example of a height inspection device, being an embodiment of the present invention.

FIG. 23 shows another example of a height inspection device of the present embodiment. The same references are applied to portions which are the same as the height inspection device in FIGS. 16, 21, and 22. In this example, the height inspection device 100 of the measurement system is the same as in FIG. 16, etc.

In the height detection portion 200 of the correction system in this example, the theory is to measure the length of the optical path using light interference. The light shining from the light source 81, such as a laser beam, is reflected by the half mirror 82 and shines on the bump 20, which is the object to be measured. Also, the light passing through the half mirror 82 passes through a reference path lens 103 and is reflected with a reference mirror 102. The laser beam reflected by each of the measured item and the reference mirror is synthesized again by the half mirror 82. The laser beam reflected by the measured item 2 and the laser beam reflected by the reference mirror 102 each have its phase at the position of the half mirror 82 according to the difference in the lengths of the optical paths. Consequently, the laser beams interfere due to this synthesis and a beat signal is generated. The interference fringe produced by this interference is detected with the image forming element 84 and the length of the optical path to the measured item can be detected according to the size of the interference fringe. Consequently, the encoder and scale to detect the Z value of the Z stage are not necessary in this example.

ELIMINATING ASTIGMATISM OF THE ACOUSTO-OPTIC DEFLECTOR

The problem of the intensity of the radiated light because of the bump surface being spherical and the problem of errors in detected height are resolved as above. In order to detect the height of a plurality of bumps on an LSI chip, the present invention uses the triangulation method, radiated light scans the LSI chip, and height is detected from the light spot position of that reflected light imaged on the light spot position sensitive detector PSD. In this case, an acousto-optic deflector is used to scan radiated light at a high speed without having to use a physical drive mechanism.

Figure 24:
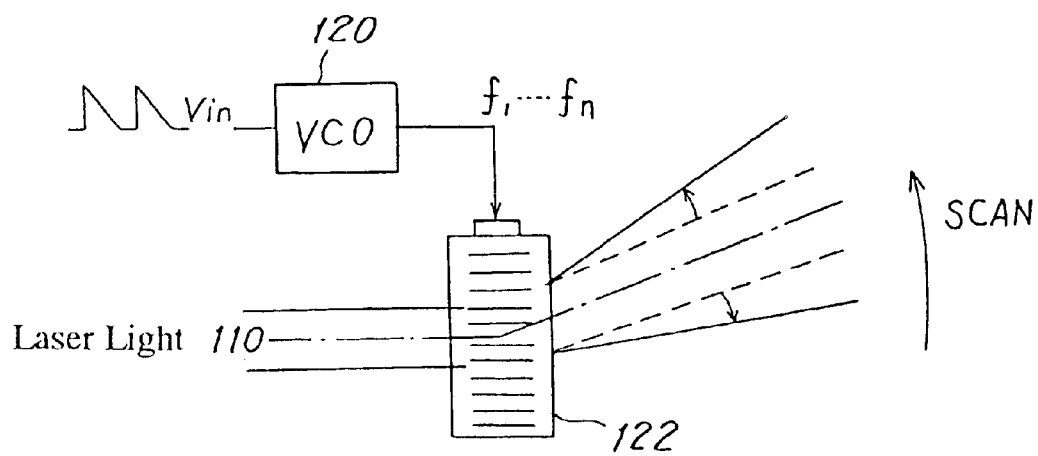
FIG. 24 is a drawing to show an acousto-optic deflector.

FIG. 24 shows such an acousto-optic deflector AOD. The AOD 122 is a crystal wherein changes in index of refraction are induced by the influence of distortion caused by the propagation of sound waves. It is used for high speed scanning of light, using the fact that the index of refraction changes depending on the frequency of the sound waves. As shown in FIG. 24, the saw-tooth waveform voltage Vin is provided to the voltage controlled oscillator (VCO) 120; the frequency of the signal produced is varied from $f_1$ to $f_n$. With the provision of that signaling frequency to the AOD 122, the index of refraction of the laser beam 110 changes over time and the laser beam is scanned in the scanning direction SCAN.

The incident laser beam 110 is a collimated beam, but the laser beam refracted by and output from the AOD 122 is a beam which has a certain spread. The reason is, when the frequency is varied at high speeds in order for high speed scanning, the index of refraction at both ends of spot diameter of the laser beam 110 differs due to the precise difference in the frequency of the sound waves impressed. Moreover, the spread of this laser beam 110 occurs only in the scanning direction SCAN and does not occur in a direction perpendicular to the point of view of FIG. 24. In this specification, this is called the cylindrical lensing effect of the AOD.

Figure 25:
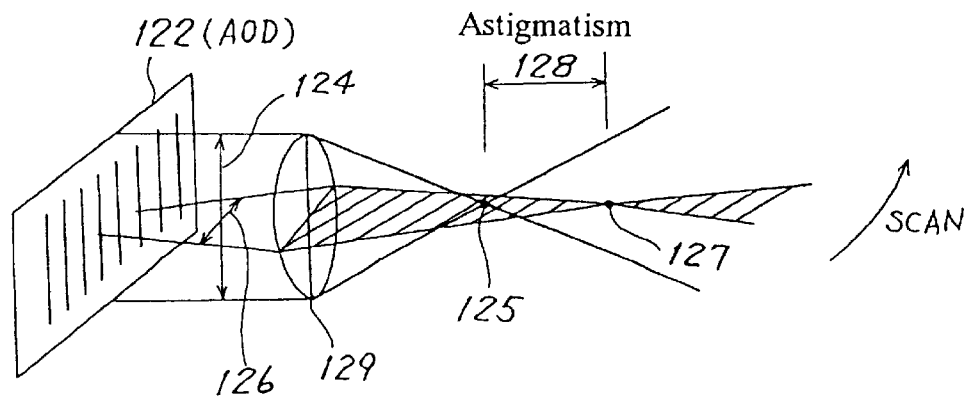
FIG. 25 is a drawing to explain the astigmatism of an acousto-optic deflector.

FIG. 25 is a figure to explain the astigmatism of the acousto-optic deflector. As above, for the laser beam refracted with the AOD 122, the beam 126 in the scanning direction has a spread due to the cylindrical lensing effect and the beam 124 in a direction perpendicular to the scanning direction remains parallel. Consequently, upon passing through the optical system 129, the focal point 125 of the beam 124 perpendicular to the scanning direction and the focal point 127 of the beam 126 in the scanning direction are at different positions. The difference 128 between these focal points 125 and 126 is called astigmatism. The presence of such astigmatism hampers precise height detection with the method of focusing the laser beam on the surface of the bump which is the measured item and detecting height from the position of the light spot of the reflected light thereof.

Figure 26:
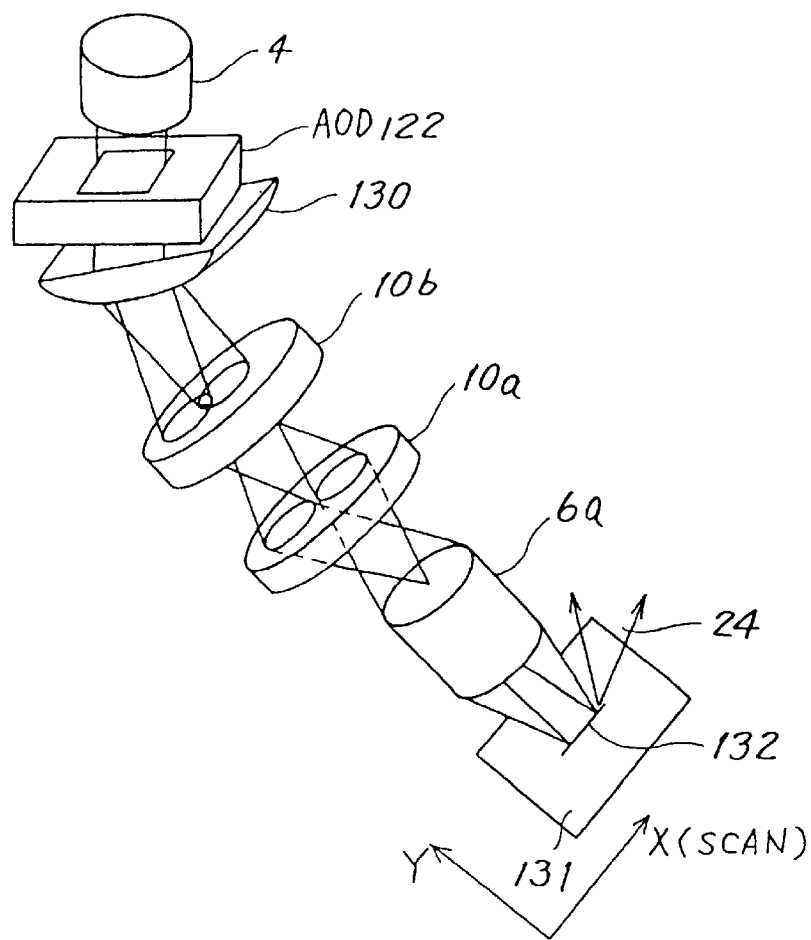
FIG. 26 is a drawing showing an example of the constitution of the radiation optical system to eliminate the cylindrical lensing effect of the AOD.

FIG. 26 shows an example of the constitution of the reference optical system to eliminate the cylindrical lens effect of the AOD. Inserting the cylindrical lens 130 to the refracted light side of the OAD 122 can return the refracted light which spreads in the scanning direction to parallel light. In the figure, 4 is the laser beam source, 10a, 10b are relay lenses, and 6a is an objective lens. It is desirable that scanning be in the X direction at a uniform velocity with the laser beam in a focused state, on the surface of the sample 131 which is the measured item.

The static cylindrical lensing effect of the AOD due to the change in scanning frequency can be mostly eliminated by the insertion of the cylindrical lens 130 as in FIG. 26. However, the properties of the AOD include a dynamic cylindrical lens effect due to the distortion of the frequency characteristics of the voltage controlled oscillator to produce the signaling frequency which is sent to the AOD.

Figure 27:
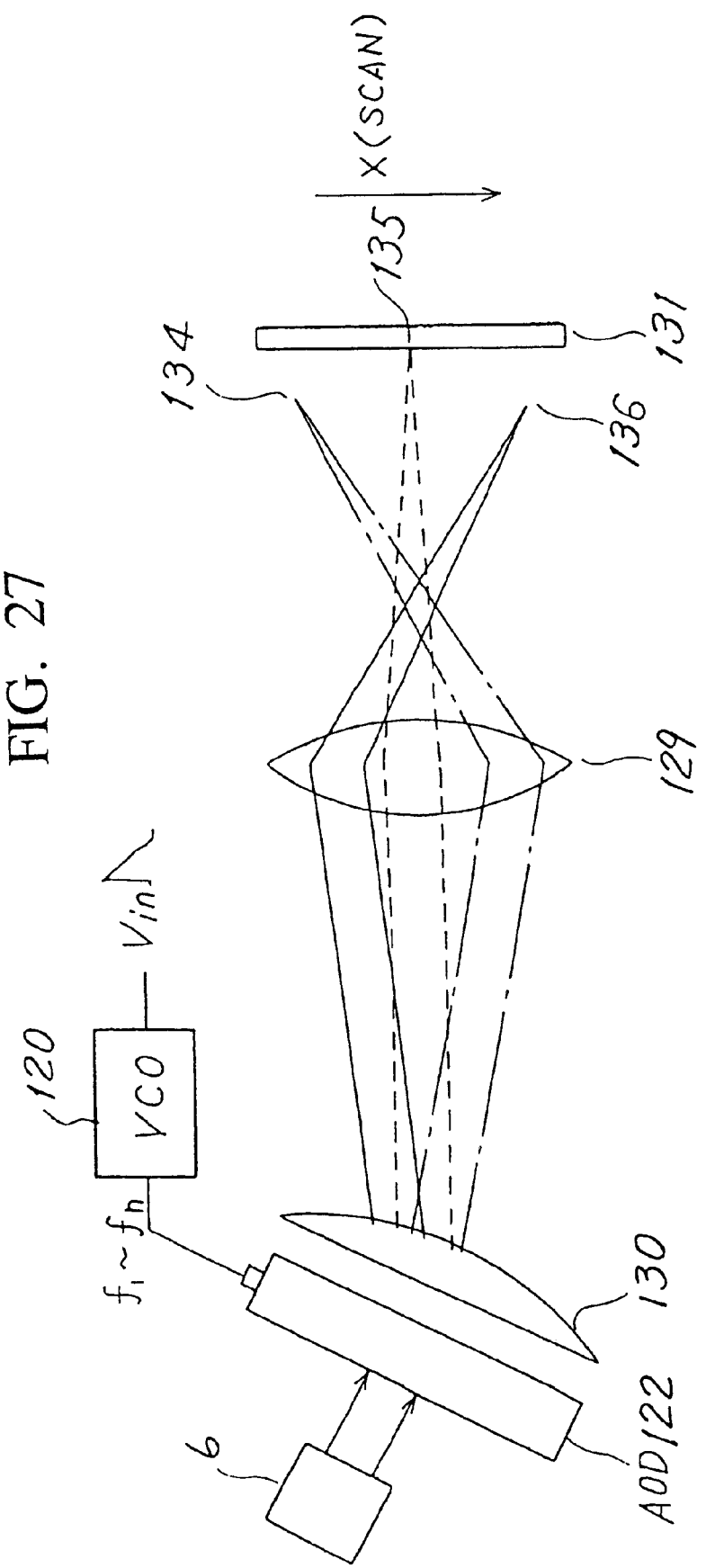
FIG. 27 is a drawing to explain the dynamic cylindrical lensing effect due to the characteristic distortion of the voltage controlled oscillator.

FIG. 27 is a figure to explain the dynamic cylindrical lensing effect due to the characteristic distortion of the voltage controlled oscillator. The laser beam is diffracted with the AOD 122 by applying a saw-tooth voltage $V_{in}$ to the voltage controlled oscillator 120; and the static cylindrical lensing effect is passably eliminated by that diffracted light passing through the cylindrical lens 130. Due to the characteristic distortion of the voltage controlled oscillator 120, variation of the output frequency is not linear and is distorted with respect to the linear variation of the input voltage $V_{in}$. Consequently, upon passing through the optical system 129, the light is sometimes thereby focused to the front, for example, or focused on the sample 131 depending on the scanning position. FIG. 27 shows the focal positions 134, 135, 136 for the light in the scanning direction. In this example, the focal point becomes the anterior focal point 134 at the initial scanning point of the sample 131. Furthermore, the focal point 135 coincides with the sample surface at the central scanning point of the sample 131. Then, the focal point becomes the anterior focal point 136 once more the final scanning position of the sample 131.

Figure 28:
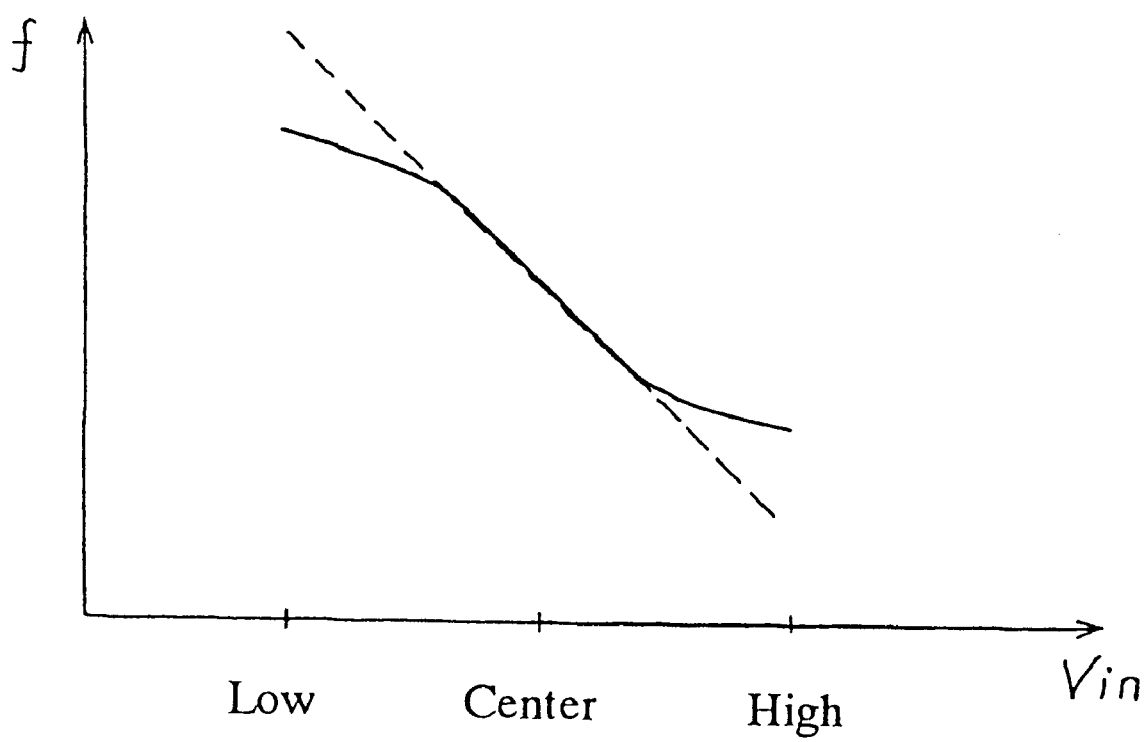
FIG. 28 is a drawing to show an example of the output frequency properties for the input voltage Vin of the voltage controlled oscillator.
Figure 29A:
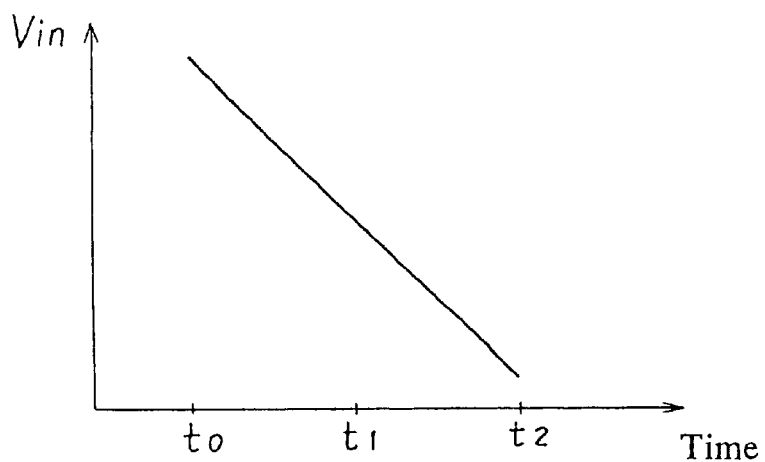
FIGS. 29A to 29D are a drawing to show the relationship between the time during laser beam scanning and the input voltage, angle of diffraction, astigmatism, scanning position, and scanning velocity.
Figure 29B:
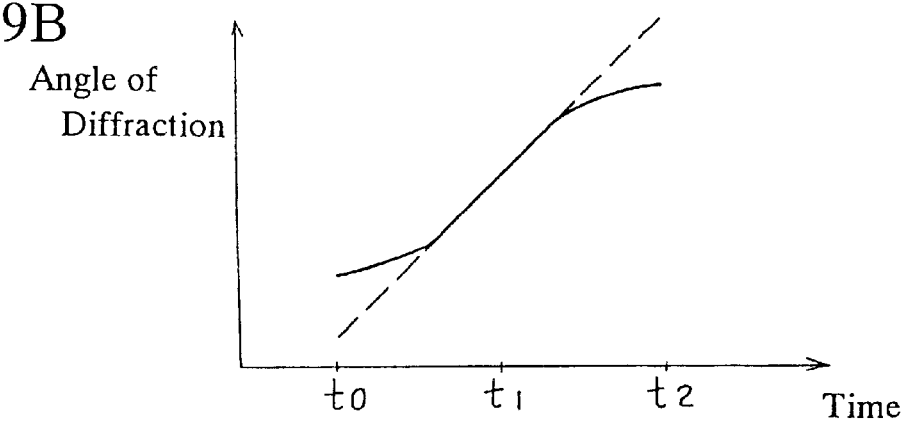
Figure 29C:
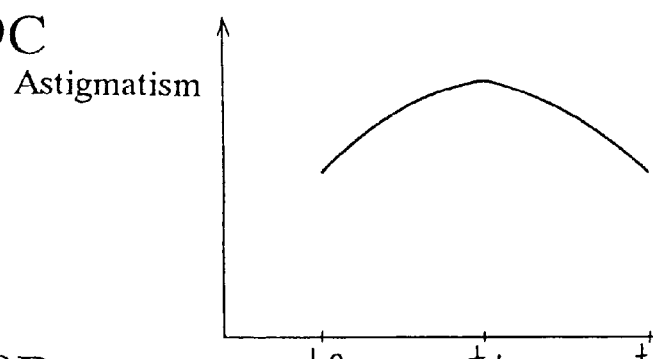
Figure 29D:
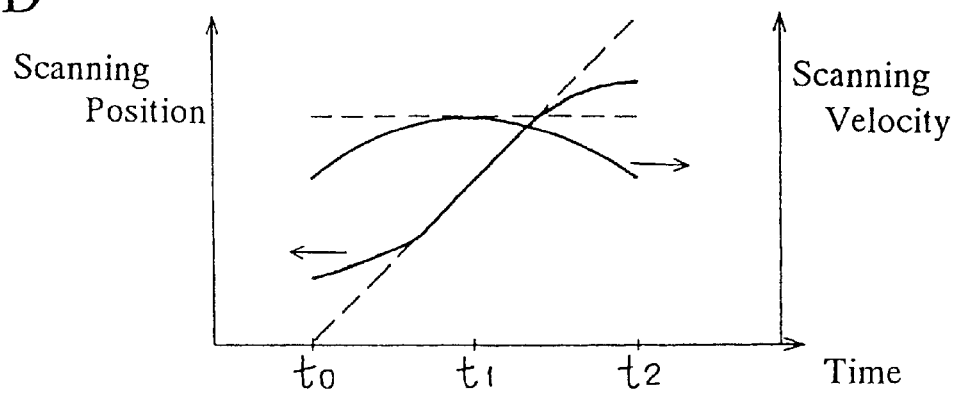

FIG. 28 is a figure to show an example of the output frequency characteristics for the input voltage $V_{in}$, of the voltage controlled oscillator 120. In this example, the solid line shows the frequency characteristics. In the zones where the input voltage $V_{in}$ is low and the zones where it is high, the rate of change of the frequency drops; in the zones where the input voltage $V_{in}$, is near the center, the rate of change of the frequency increases. Ideally, the characteristics shown by the broken line, showing a linear change of the frequency with respect to a linear change of the input voltage $V_{in}$, are preferred. However, the voltage controlled oscillator generally has the distortion characteristics as shown in FIG. 28. These distortion characteristics are one example.

As shown in FIG. 28, the distortion, in the characteristics of the output frequency of the voltage controlled oscillator 120, results in the occurrence of the phenomenon in which the position of the focal point is different due to the scanning position as explained in FIG. 27. In other words, the zones where the input voltage Vin is high and the zones where it is low correspond to the zones where the output frequency is low and the zones where it is high, in the diagram of the characteristics shown in FIG. 28. At that time, as the change of frequency is slow in both zones, the spread of the light in the scanning direction, explained in FIG. 24, becomes small. Meanwhile, in zones where the input voltage is in the center, the change in output frequency is fast and the spread of the light in the scanning direction, explained in FIG. 24, becomes large. This is because, even for the same spot diameter of the laser beam, the difference between the frequency at both ends of the spot is small and the spread of the beam becomes small in the case where the change of the frequency is slow; and the difference between the frequency at both ends becomes large and the spread of the beam becomes large in the case where the change of the frequency is fast. Consequently, as shown in FIG. 27, the focal point becomes the anterior focal points 134 and 136 at the initial and final scans when the focal point 135 is on the sample 131 at the central portion of laser beam scanning.

For this dynamic cylindrical lensing effect due to the distortion characteristics of the voltage controlled oscillator, the input voltage Vin may be distorted and applied according to the characteristics of that circuit, so that the change of the output frequency becomes constant. However, since the characteristics of the voltage controlled oscillator differ respectively, it is necessary to combine the characteristics for each inspection device and establish the curve showing the change of the input voltage Vin.

Furthermore, since the cylindrical lens 130 itself has tolerance, the static cylindrical lensing effect cannot be eliminated completely by simply inserting the cylindrical lens 130 to the rear of the AOD 122. Also, the tolerance of the optical system is different for each inspection apparatus; therefore it is desirable to eliminate the errors due to that as well.

Most ideally, the cylindrical lens 130 is inserted to the rear of The AOD 122 and the input voltage vin is set to the optimum sweep waveform. Thereby it is possible to realize scanning where i n the laser beam moves over the sample at a uniform velocity and focuses on the sample with an astigmatism of zero in all scanning zones. The method to attain this is explained below.

FIG. 29 is a figure to show the relationship between the time during laser beam scanning and input voltage angle of diffraction, astigmatism, scanning position, and scanning velocity. In the case where the sweep waveform of the input voltage vin is a straight line as in FIG. 29A, the change of the angle of diffraction due to the AOD becomes as shown by the solid line in FIG. 29B. In other words, the change of the angle of diffraction becomes slow at the time t0 when scanning starts, the change of the angle of diffraction becomes fast at the time t1 during the middle, and then the change of the angle of diffraction becomes slow at time t2 when scanning ends. Accordingly, as shown in FIG. 29D, the scanning position is distorted as shown by the solid line, and the scanning velocity becomes slow at the beginning and end, and fast at t1 in the middle. Accordingly, astigmatism becomes low at each end but high in the middle as shown in FIG. 29C.

Figure 30:
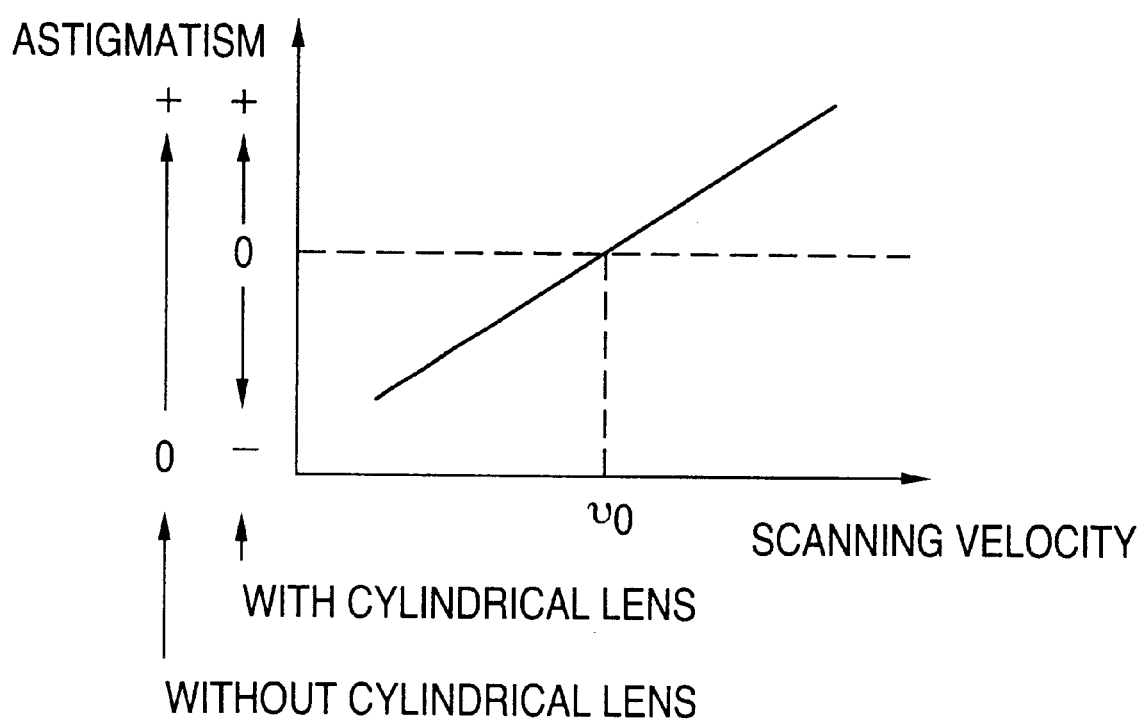
FIG. 30 is a drawing to show the relationship between the scanning velocity and astigmatism.

FIG. 30 is a figure to show the relationship between scanning velocity and astigmatism. As explained above, astigmatism becomes great when scanning velocity is high and low when scanning velocity is low. In FIG. 30, the vertical axis shows the astigmatism when the cylindrical lens is not inserted and the astigmatism when it is inserted. When the cylindrical lens is inserted, the light in the scanning direction has a zero astigmatism at a certain velocity $v_0$. Consequently, a zero astigmatism in all scanning zones can be realized if this velocity $v_0$ is realized during the entire scanning range.

Figure 31:
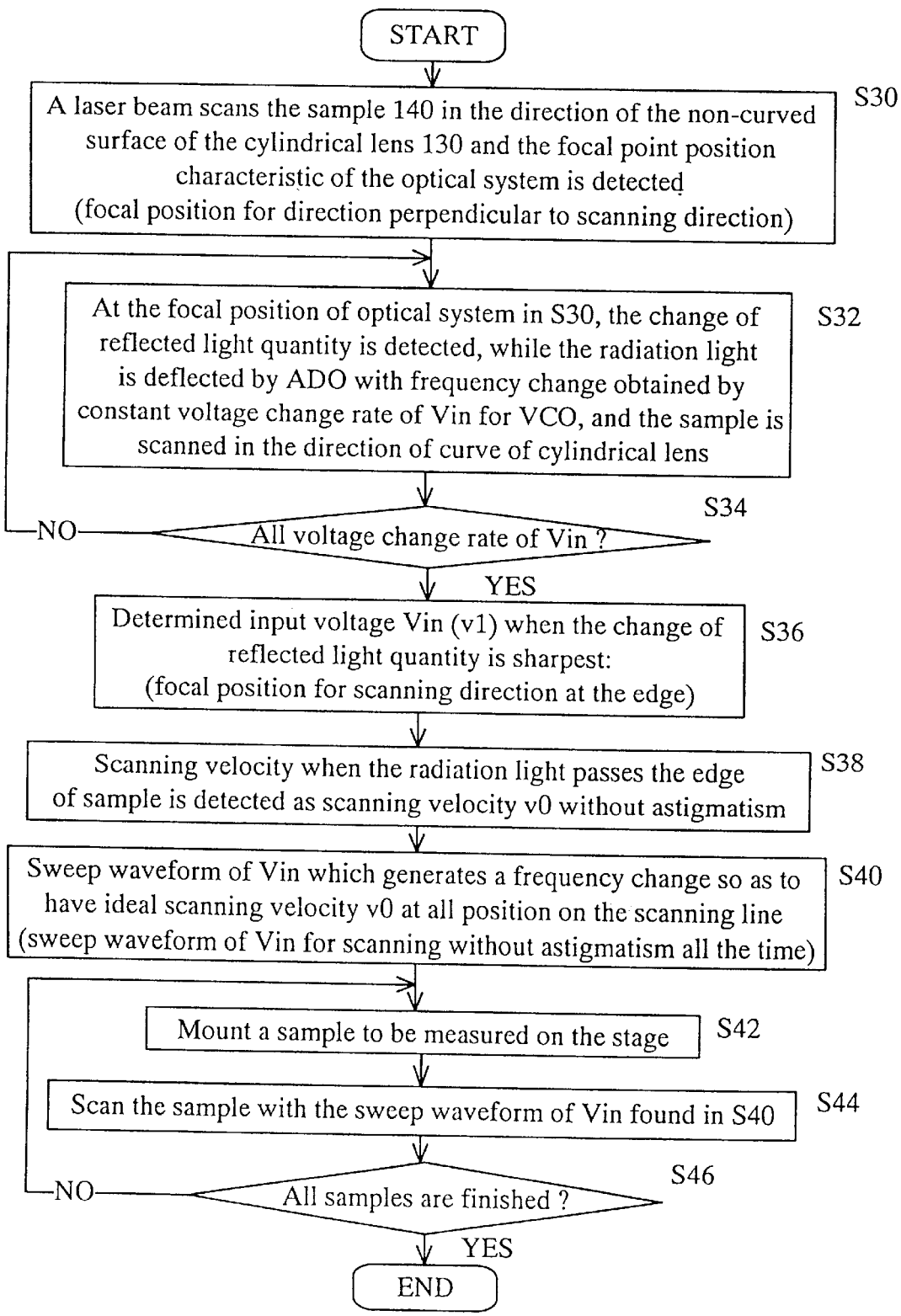
FIG. 31 is a flowchart of setting the ideal sweep voltage curve of the input voltage $V_i n$ and effecting height detection.
Figure 32:
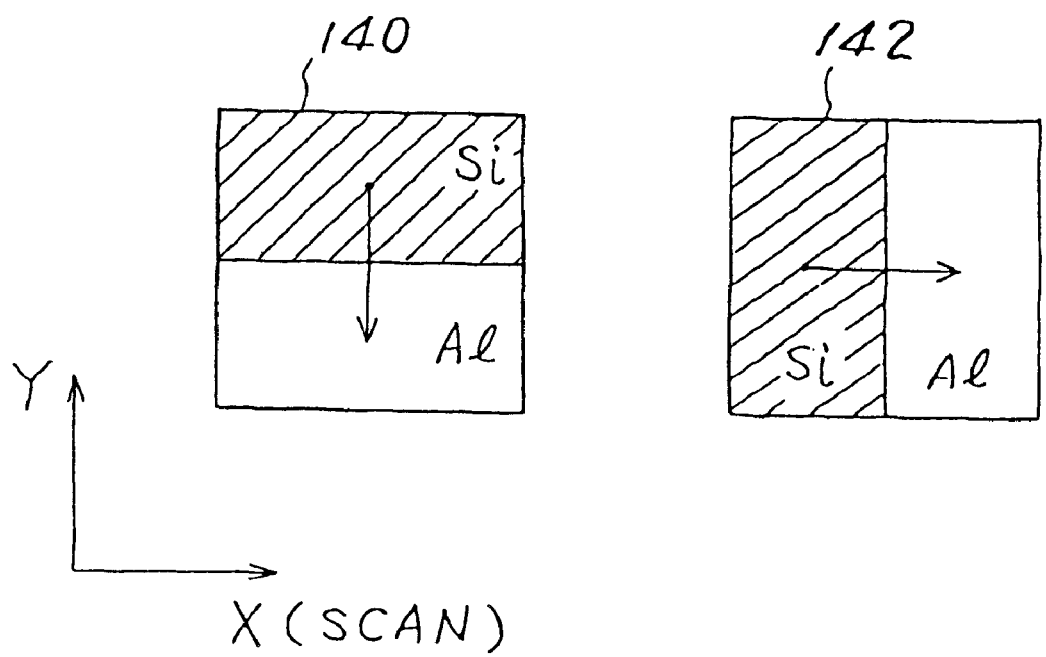
FIG. 32 is a drawing to show two types of samples.

FIG. 31 is a flow chart showing height detection with the ideal sweep voltage curve of the input voltage $V_{in}$. In this flowchart of the present embodiment, the optimum scanning velocity $v_0$ peculiar to the optical system and the sweep voltage curve of the input voltage $V_{in}$ for constant scanning at that velocity are found by detecting the quantity of scanning light (light intensity) reflected while arbitrarily controlling voltage applied to the voltage controlled oscillator. Two types of setting sample shown in FIG. 32 are used in order to effect this. The setting sample 140 is formed with a pattern of the zone with high reflectance and the zone with low reflectance (shaded portion) in the direction of the Y axis which is perpendicular to the X axis which is the scanning direction of the radiated light. This pattern is formed from a silicon substrate (low reflectance, shaded portion) and an aluminum layer formed on its surface (high reflectance, white portion), for example. Also, the setting sample 142 is formed with a similar pattern of the zone with high reflectance and the zone with low reflectance (shaped portion) as in the scanning direction (in the direction of the X axis) of the radiated light.

Figure 33A:
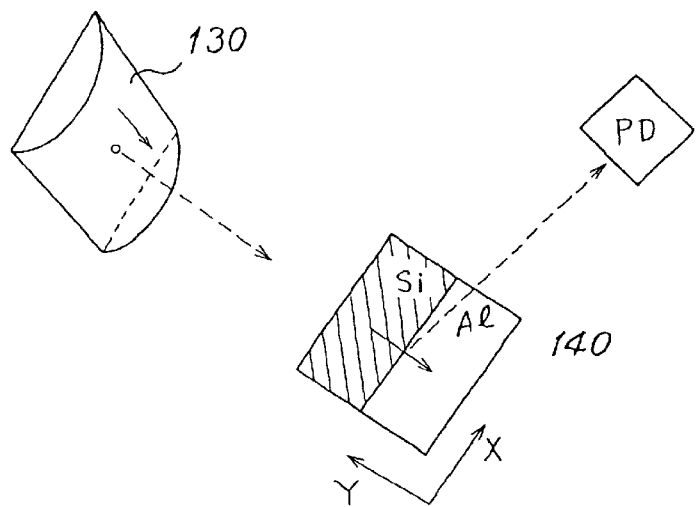
Figure 33B:
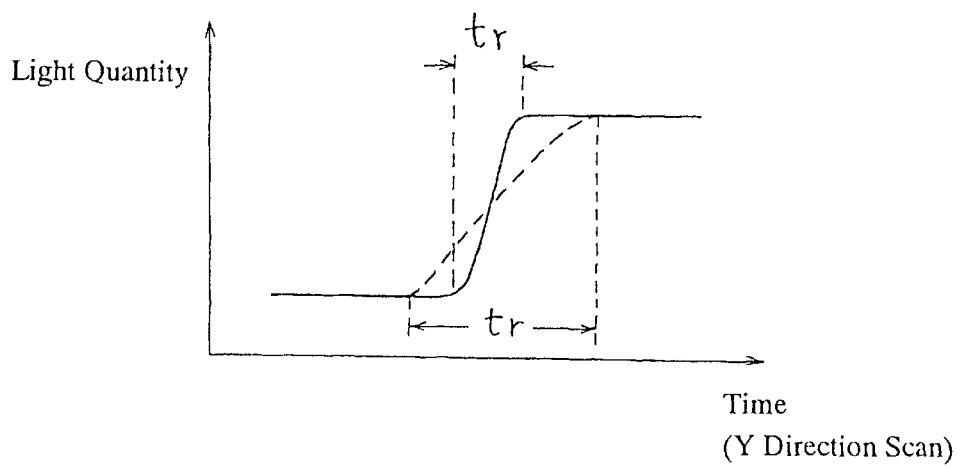

As shown in FIG. 31, as the first stage, a laser beam scans the sample 140 in the direction of the non-curved surface of the cylindrical lens 130 and the focal point position characteristic of the optical system is detected (Step S30). FIG. 33 is a figure to explain the method for detecting the focal position of the optical system in Step S30. As shown in FIG. 33($a$), the input voltage $V_{in}$ provided to the voltage controlled oscillator is constant and the scanning of the laser beam is maintained in a state where it stops in the center of the sample 140. Then, the stage is moved at a constant speed in the direction of the Y axis in t he figure and the quantity of reflected light (light intensity) at that time is monitored with the PSD or photodiode The relationship of time to the quantity of light observed at that time is as shown in FIG. 33B; the quantity of light builds up at the boundary of the pattern on the sample 140. In that case, the length of the optical path is changed by varying the stage in the direction of the Z axis or varying lens position, for the detection of the position where the time tr, for the quantity of light to build up, is the shortest. That position is the state where the sample is positioned at the focal point. The broken line in FIG. 33B shows the waveform of the quantity of light when the sample is not at the focal point; the solid line is the waveform when the sample is at the focal point position.

Next, as the second stage, is the step to find the scanning velocity, at which the focal point in the scanning direction of light deflected with the AOD, agrees with the focal point found in Step S30. In other words, this is the step to find the scanning velocity $v_0$ (See FIG. 30) where astigmatism becomes zero.

FIG. 34 is a figure to explain the second stage step for finding the scanning velocity $v_0$ (See FIG. 30) where astigmatism becomes zero. The sample (142) is positioned at the focal position found in Step S30; and as shown in FIG. 34A, the input voltage $V_{in}$ of the voltage oscillation circuit is varied linearly and the laser beam scans the sample 142 in the direction of the X axis. Then, the rate of change of the input voltage $V_{in}$ is varied as $v_1$, $v_2$, and $v_3$ as shown in FIG. 34B; the quantity of reflected light detected at that time is detected as shown in FIG. 34C. The rate of change $v_2$ of the voltage $V_i$n, when the time for the quantity of light to build up as shown with the solid line $v_2$ in FIG. 34C becomes shortest, is found. It is understood that astigmatism becomes zero at the position of the pattern edge in the center of the sample 142 when the input voltage $V_{in}$ is applied at this rate of change $v_2$.

Figure 34A:
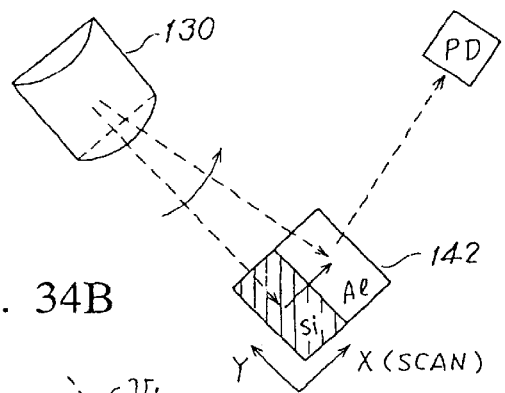
FIGS. 34A to 34D are a drawing to explain the step of detecting the scanning velocity $v_0$ where astigmatism is zero.
Figure 34B:
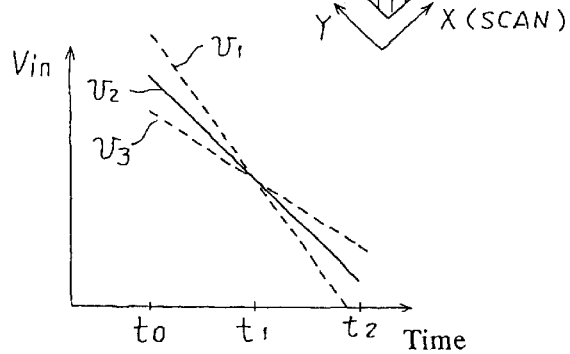
Figure 34C:
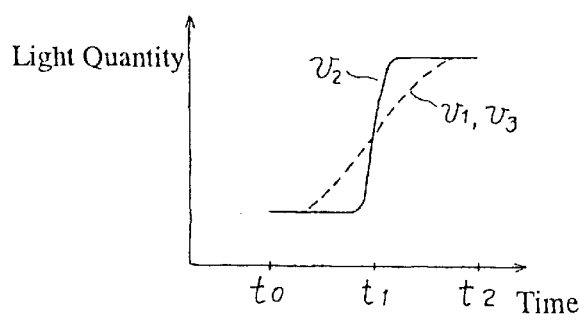
Figure 34D:
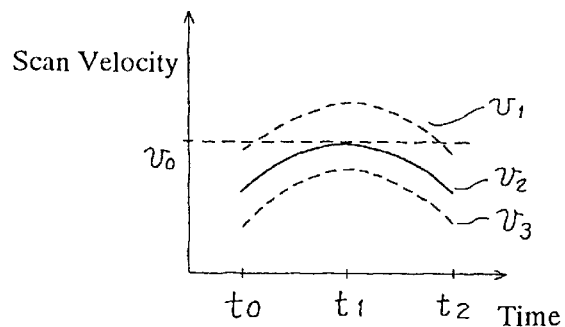

In the case of an input voltage $V_{in}$ which is changed linearly as in FIG. 34B, the scanning velocity of the laser beam becomes great in the middle of scanning t1 and small at the start t0 and end t2, as shown in FIG. 34D, due to the characteristic distortion of the voltage controlled oscillator. Consequently, when the rate of change of the input voltage $V_{in}$ is varied as in FIG. 34B, the scanning velocity rises and falls as shown in FIG. 34D.

Consequently, the scanning velocity, shown with the solid line, at the time t1 in the center of the scanning zone corresponding to the edge of the pattern of sample 147 is the ideal scanning velocity $v_0$ where astigmatism becomes zero. The second stage step corresponds to steps S32, S34, and S36 in the flowchart in FIG. 31. At this stage, the rate of change $v_1$ of the input voltage $V_{in}$, where the ideal scanning velocity $v_0$ can be realized at the position of the pattern edge, is revealed.

Next, as the third stage, the ideal scanning velocity, when astigmatism is zero, is found. The sample 142 is moved in the scanning direction by just $\Delta x$ while the rate of change $v_1$ of the input voltage $V_{in}$ determined in the second stage is maintained and the laser beam scans the sample 142. At this time, the change $\Delta t$ of the time for the build up of the quantity of reflected light (intensity) as in FIG. 34C is found. As a result, the scanning velocity $v_0$ where astigmatism is zero is found as $v_0 = \Delta x/\Delta t$ (S38).

Figure 35A:
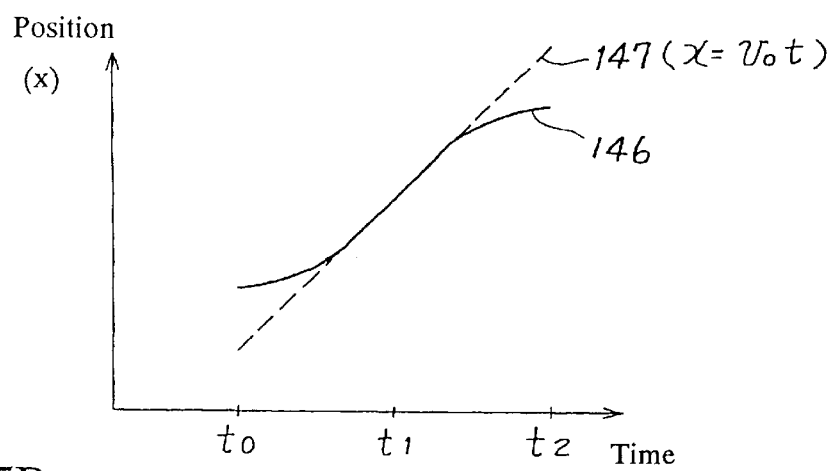
FIGS. 35A and 35B are a drawing to explain an example of the method of finding the sweep waveform of the input voltage $V_{in}$.
Figure 35B:
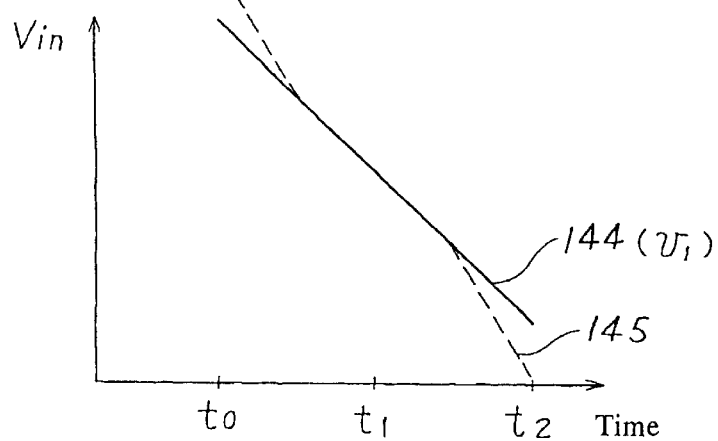

Then, as the fourth stage, the sweep waveform of the input voltage $V_{in}$, so as to have the ideal scanning velocity $v_0$ at all positions on the scanning line, is found (S40). A variety of methods are considered for that. FIG. 35 is a figure to explain one example of this. When the input voltage $V_{in}$ of the voltage controlled oscillator is varied linearly as shown with the solid line 144 as shown in FIG. 35B, the scanning position of that is clearly distorted as shown with the solid line 146 in FIG. 35A. This detection of scanning position can be simply effected by, for example, by moving the edge position of the sample 152 to a plurality of known positions in the scanning direction (direction of X axis) and plotting the time for the quantity of reflected light to build up.

The ideal scanning velocity $v_0$ can be realized throughout the entire scanning range through changing into the linear variation of the scanning position of the broken line 147 from the solid line 146 shown in FIG. 35 A. Consequently, the input voltage $V_{in}$ is changed so that the scanning position of the solid line 146 can be changed to the scanning position of the broken line 147. When the input voltage vin is plotted for each change, the ideal sweep curve 145 shown by the broken line in FIG. 35B is found.

Consequently, by providing the input voltage $V_{in}$ to the voltage oscillation circuit on the ideal sweep curve 145, it is possible to realize scanning at the scanning velocity $v_0$, where astigmatism becomes zero, throughout the entire scanning zone. The initial setting of the input voltage $V_{in}$ is completed by these four stages. The sweep curve of the input voltage $V_{in}$ found with this initial setting is a curve where astigmatism becomes zero through the entire scanning zone with consideration of all these properties: tolerance of the optical system, tolerance of the cylindrical lens, characteristics of the voltage oscillation circuit. Also, it is the sweep curve where the scanning at a uniform velocity is realized. Consequently, the sweep curve of the ideal input voltage Vin can be found for the height detection device simply by scanning samples 140 and 142 and observing the change of quantity of reflected light at that time.

As shown in Steps S42 to S46 in FIG. 31, the sample, being the measured item, is mounted on the stage, a laser beam is scanned at the sweep curve of the input voltage $V_{in}$ found in the fourth stage (S40), while in the state where the optical system is at the focal point found in the first stage (S30), and the height of the sample is detected with the triangulation method. This height detection is effected until the inspection of all samples to be inspected is complete. With this height detection step, height detection with a greater precision can be effected, as discussed already, by optimum modulation of the driving signal of the laser element and correction of the detection output of the light spot position sensitive device PSD.

Figure 36:
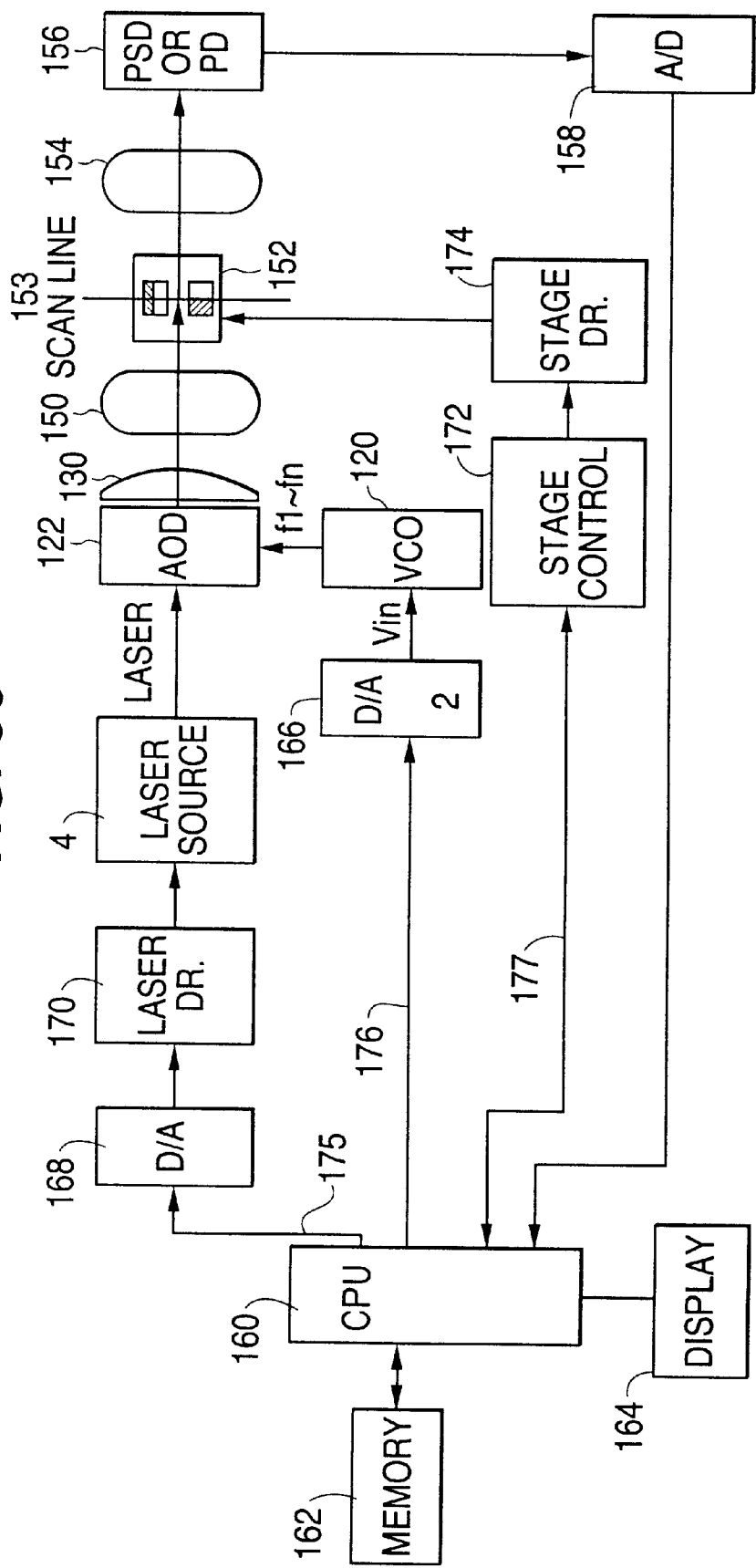
FIG. 36 is a drawing to show an example of the constitution of the inspection device to find the ideal sweep curve of the input voltage $V_i$.

FIG. 36 is a figure to show an example of the constitution of an inspection apparatus to find the ideal sweep curve of the input voltage $V_{in}$, In this constitution, the laser beam from the laser beam source 4 is deflected with the AOD 122 and is radiated on the sample on the stage 152 via the cylindrical lens 130 and the optical system 150 on the scanning side. The laser beam scans the sample on the stage 152 by sweeping the input voltage applied to the voltage oscillation circuit 120. The quantity of the reflected light passing through the received light optical system 154 is detected with the photosensor 156. The photosensor 156 may be the light spot position sensitive detector PSD, for example, and the sum of its output signals (a+b) is the quantity of light (light intensity). Also, it may be a photodiode. The quantity of light detected is converted to a digital value with an A/D conversion circuit 158 and is supplied to the CPU 160.

CPU 160 is connected t o the memory 162 and the display 164. Furthermore, the CPU 160 provides the driving signal 175 of the laser light source 4 to the laser driver 17 via the D/A conversion circuit 168. Also, the CPU 160 provides the signal 176 of the input voltage value of the voltage controlled oscillator 120. Furthermore, it provides the stage driving signal 177 to the stage controller 172. The stage driver 174 is driven by the stage controller 172 and the stage 152 is driven is driven.

In case of the inspection apparatus shown in FIG. 36, the input voltage $V_{in}$ for the voltage oscillation circuit 120 can be varied arbitrarily with the CPU 160 and the quantity of light detected at that time can be monitored. Also, the quantity of light detected can be monitored while arbitrarily varying the position and direction of the stage 152.

Furthermore, it is preferable that a pattern having a uniform rate of change for the entire scanning zone is added as the correction pattern and the quantity of reflected light at the time of scanning on that uniform pattern is observed; and if there are irregularities in that quantity of light, it is preferable that the laser driving signal be modulated to cancel out those irregularities. As a result, irregularities, etc., in reflection intensity caused by the transmittance properties of the AOD, the properties of the visual field of the optical system, and reflection properties of the sample can be corrected.

An LSI chip surface having bumps, being the measured sample, can be scanned at a uniform velocity in the state where astigmatism occurring because of the cylindrical lens effect of the acousto-optic deflector is eliminated. Consequently height inspection with high precision can be effected even with high speed scanning.

As explained above, the modulation of intensity of irradiation of the apex portion of bumps formed on the surface of a semiconductor chip, etc., can be effected accurately and at high speed with the present invention. Consequently, a height inspection step for bumps at high speeds and with good precision can be effected.

Furthermore, height inspection, with high precision and at high speeds, in the same way, can be effected even for an inspected object other than a semiconductor chip.

Furthermore, more correct height detection can be effected with the present invention since errors in the detected height values due to the curved surface of the bumps, etc., can be appropriately corrected.

Furthermore, the surface of an inspected sample can be scanned with radiated light at a uniform speed and without astigmatism with the present invention.

What is claimed is:

1. A method for inspecting height, by scanning a surface of a subject item with incident light having a prescribed intensity, causing light reflected from the surface to be imaged to a light spot position detecting device, and detecting the height of said surface from the light spot position which was imaged, wherein the surface of the subject item includes a first zone having a high reflectance regarding a ratio of the incident light intensity to the reflected light intensity to be imaged to the light spot position detecting device and a second zone having a low reflectance and surrounding the first zone, said method comprising:

scanning, in a second zone, with a first fixed intensity of incident light, which is low to the degree that said light spot position detecting device is not saturated even with said high reflectance;

detecting a boundary between the second and first zones when the intensity of the reflected light to be imaged exceeds a prescribed threshold value while the first fixed intensity of incident light is being used; and scanning, in the first zone, with a modulated second intensity of incident light determined by said intensity of incident light and said intensity of the reflected light to be imaged at the time of the preceding scan.

2. A method for inspecting height according to claim 1, wherein said second intensity of incident light $Pn+1(i)$ is determined by a calculation according to the formula $$Pn+1(i)=Pn(i)\times Bt/Bn(i)$$

where $Bt$ is a prescribed value within the dynamic range of said light spot position detecting device, and wherein an intensity of incident light is $Pn(i)$ at the time of the preceding scan and the quantity of light detected at that time is $Bn(i)$.

3. A method for inspecting height according to claim 1, further comprising, scanning in zones other than said first and second zones while said intensity of incident light is set to zero.

4. A method for inspecting height, according to claim 1, wherein said prescribed threshold value is set at a value higher than the quantity of light detected for said first intensity of incident light in said second zone.

5. A method for inspecting height according to claim 1, wherein said subject item includes bump terminals with a roughly spherical form formed on a substrate surface; said first zone is in the vicinity of the apex of said bump terminal; and said second zone is a zone surrounding the vicinity of said bump apex.

6. A height inspection apparatus, which scans a surface of a subject item with incident light having a prescribed intensity, which causes the reflected light from the surface to be imaged to a light spot position detecting device, and which detects the height of said surface from the light spot position which was imaged, wherein the surface of the subject item includes a first zone having a high reflectance regarding a ratio of the incident light intensity to the reflected light intensity to be imaged to the light spot position detecting device and a second zone having a low reflectance and surrounding the first zone, said apparatus comprising:

a light-emitting device to generate said incident light;

a light emission driver to drive said light emitting device; and a modulator to control said light emission driver in such, a manner that, for scanning in a second zone, the light emitting device generates a first fixed intensity of incident light, which is low to the degree that said light spot position detecting device is not saturated even with said high reflectance, then if the quantity of said reflected light to be imaged is detected to exceed a prescribed threshold value, the light emitting device generates a modulated second intensity of incident light determined by said intensity of incident light and said intensity of the reflected light to be imaged at the time of the preceding scan.

7. A light inspection apparatus, according to claim 6, wherein said modulator determines said second intensity of incident light $Pn+1(i)$ through a calculation according to the formula $$Pn+1(i)=Pn(i)\times Bt/Bn(i)$$

where $Bt$ is a prescribed value within the dynamic range of said light spot position detecting device, and where an intensity of incident light is $Pn(i)$ at the time of the preceding scan and the quantity of light detected at that time is $Bn(i)$.

8. A height inspection apparatus according to claim 6 or 7, wherein said modulator controls said light emission driver in such a manner that said intensity of incident light is set to zero in zones other than said first and second zones.

9. A height inspection apparatus according to claim 6, wherein said prescribed threshold value is set at a value higher than the quantity of light detected for said first intensity of incident light in said second zone.

10. A height inspection apparatus according to claim 6, wherein said subject item includes bump terminals with a roughly spherical form formed on a substrate surface; said first zone is in the vicinity of the apex of said bump terminal; and said second zone is a zone surrounding the vicinity of said bump apex.

11. A method for inspecting height, by radiating incident light on the surface of a subject item having a nonplanar surface, causing light reflected from said surface to be imaged with a light spot position detecting device, and detecting the height of said surface from the light spot position which was imaged, said method comprising:

causing a stage on which a standard subject item is mounted to move in the direction of the Z axis and detect the height of the surface of said standard subject item as a first corrective height value;

radiating incident light on said surface of said standard subject item, causing the light reflected from said surface to be imaged with said light spot position detecting device, and detecting the height of the surface of said standard subject item from the light spot position which was imaged as a second corrective height value;

radiating incident light on the surface of said subject item, causing the reflected light from said surface to be imaged with said light spot position detecting device, and detecting the height of the surface of said subject item from the light spot position which was imaged as a measurement height value; and correcting said measurement height value, according to a correlation between said first corrective height value and second corrective height value, and preparing a corrected height value.

12. A method for inspecting height, according to claim 11, wherein said first corrective height value is found from the Z axis coordinates of said stage when light from a light source irradiates the surface of said standard subject item and reflected light reflected from said surface is focused to a prescribed position, in said first step of corrective height detection.

13. The method for inspecting height, according to claim 11, further comprising:

finding the correlation between said first corrective height value and second corrective height value as a conversion function or using a conversion table found through the method of least squares;

and wherein said measurement height value is converted to a corrected height value according to the said conversion function or conversion table, in said correcting step.

14. A method for inspecting height, by radiating incident light on a surface of a subject item having a nonplanar surface, causing the reflected light from said surface to be imaged with a light spot position detecting device, and detecting the height of said surface from the light spot position which was imaged, comprising:

receiving reflected light of light irradiated to the surface of a standard subject item, finding a distance from a prescribed position to the surface of said standard subject item according to a phase of the received light, and detecting the height of the surface of said standard subject item as a first corrective height value from said distance;

radiating said incident light on said surface of said standard subject item, causing the reflected light from said surface to be imaged with said light spot position detecting device, and detecting the height of the surface of said standard subject item from the light spot position which was imaged as a second corrective height value;

radiating incident light on the surface of said subject item, causing the reflected light from said surface to be imaged with said light spot position detecting device, and detecting the height of the surface of said subject item from the light spot position which was imaged as a measurement height value; and correcting said measurement height value, according to a correlation between said first corrective height value and second corrective height value, and preparing a corrected height value.

15. A height inspection apparatus, radiating incident light on a surface of a subject item having a nonplanar surface, causing the reflected light from the surface to be imaged with a light spot position detecting device, and detecting the height of said surface from the light spot position which was imaged, said apparatus comprising:

a first corrective height detection device to cause a stage on which a standard subject item is mounted to move in the direction of the Z axis and to detect the height of the surface of said standard subject item as a first corrective height value;

a second corrective height detecting device to radiate incident light on said surface of said standard subject item, to cause the reflected light from that surface to be imaged with said light spot position detecting device, and to detect the height of the surface of said standard subject item from the light spot position which was imaged as a second corrective height value;

a height measurement detecting device to radiate incident light on the surface of said subject item, to cause the reflected light from the surface to be imaged with said light spot position detecting device, and to detect the height of the surface of said subject item from the light spot position which was imaged as a measurement height value; and a correction unit to correct said measurement height value, according to a correlation between said first corrective height value and second corrective height value, and to prepare a corrected height value.

16. A method for inspecting height, by deflecting incident light with an acousto-optic deflector, scanning the surface of a subject item with the deflected incident light via a cylindrical lens and an incident light optical system, causing the reflected light from that surface to be imaged with a light spot position detecting device, and detecting the height of said surface from the light spot position which was imaged, said method comprising:

scanning a setting sample having a prescribed pattern on a stage, on which said subject item is mounted, with said incident light, while varying an input signal of a driving circuit to provide a scanning frequency signal to said acousto-optic deflector, and, through observing the quantity of the reflected light, finding a sweep curve of said input signal such that said incident light is scanned at a uniform speed and is focused without astigmatism on the said setting sample; and providing said input signal according to said sweep curve to said driving circuit, scanning said incident light on the surface of said measured object, causing the reflected light from that surface to be imaged with said light spot position detecting device, and detecting the height of said surface from the light spot position which was imaged.

17. The method for inspecting height, according to claim 16, wherein said scanning step comprises:

setting a position of said incident light optical system and said stage, so that a focal position of the incident light, in a direction perpendicular to the scanning direction of said acousto-optic deflector, is positioned on said setting sample;

detecting the scanning speed where the focal position of the incident light in the scanning direction is positioned on said setting sample, while the position of said incident light optical system and stage position of said incident light optical system and stage are as set in said seting step; and finding the sweep curve of said input signal such that said incident light can maintain said scanning speed within the scanning zone on said setting sample.

18. A height inspection apparatus, deflecting incident light with an acousto-optic deflector, scanning a surface of a subject item with the deflected incident light via a cylindrical lens and an incident light optical system, causing the reflected light from said surface to be imaged with a light spot position detecting device, and detecting the height of said surface from the light spot position which was imaged, said apparatus comprising:

a setting device to scan a setting sample having a prescribed pattern on a stage on which said subject item is mounted with said incident light, while varying an input signal of a driving circuit to provide a scanning frequency signal to said acousto-optic deflector, and, through observation of the quantity of the reflected light, to find a sweep curve of said input signal such that said incident light is scanned at a uniform speed and is focused without astigmatism on the said setting sample; and a said surface to be imaged with said light spot position detecting device, and to detect the height of said surface from the light spot position which was imaged.

19. A method for inspecting a height of an object having a first zone having a first reflectance and a second zone having a second reflectance lower than the first reflectance and surrounding the first zone, comprising:

scanning the second zone with a first fixed intensity of incident light;

detecting a boundary between the second and first zones when the intensity of the reflected light to be imaged exceeds a threshold value while the first fixed intensity of incident light is being used; and scanning the first zone with a modulated second intensity of incident light determined by said intensity of incident light and said intensity of the reflected light to be imaged at the time of a preceding scan.

* * * * *

UNITED STATES PATENT AND TRADEMARK OFFICE
CERTIFICATE OF CORRECTION

PATENT NO.: 5,999,266
DATED : December 7, 1999
INVENTOR(S): Fumuyuki TAKAHASHI, et al.

It is certified that error appears in the above-identified patent and that said Letters Patent is hereby corrected as shown below:

Column 24,   line 21, change "havinga" to --having a-- ;

line 52,     after "6" delete "or" ;

line 53,     before "," delete "7".

Signed and Sealed this

Twentieth Day of February, 2001

*Attest:*

NICHOLAS P. GODICI

*Attesting Officer*      *Acting Director of the United States Patent and Trademark Office*